United States Patent
Choi et al.

(10) Patent No.: US 10,762,850 B2
(45) Date of Patent: Sep. 1, 2020

(54) DISPLAY DEVICE AND DRIVING METHOD THEREOF

(71) Applicant: Samsung Display Co., Ltd., Yongin-si, Gyeonggi-do (KR)

(72) Inventors: Sang Moo Choi, Yongin-si (KR); Jae Du Noh, Yongin-si (KR); Seung Yeon Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 118 days.

(21) Appl. No.: 15/856,807

(22) Filed: Dec. 28, 2017

(65) Prior Publication Data

US 2018/0197480 A1    Jul. 12, 2018

(30) Foreign Application Priority Data

Jan. 10, 2017    (KR) ........................ 10-2017-0003500

(51) Int. Cl.
  *G09G 5/00*        (2006.01)
  *G09G 3/3266*    (2016.01)
  (Continued)

(52) U.S. Cl.
  CPC ......... *G09G 3/3266* (2013.01); *G09G 3/3275* (2013.01); *H04N 13/344* (2018.05);
  (Continued)

(58) Field of Classification Search
  USPC ..... 345/204, 213, 690, 698, 8, 14, 211, 214, 345/545, 695, 696, 92, 174, 156, 205;
  (Continued)

(56) References Cited

U.S. PATENT DOCUMENTS 9,035,976 B2    5/2015    Lee et al.
9,183,781 B2    11/2015    Jang
(Continued)

FOREIGN PATENT DOCUMENTS

EP    3343545 A1    7/2018
JP    2016-532900 A    10/2016
(Continued)

OTHER PUBLICATIONS

EPO Extended Search Report dated Jun. 5, 2018, for corresponding European Patent Application No. 18151000.9 (10 pages).
(Continued)

*Primary Examiner* — Thuy N Pardo
(74) *Attorney, Agent, or Firm* — Lewis Roca Rothgerber Christie LLP

(57) ABSTRACT

A display device includes a display area to display an image in different areas, the display area including first, second, and third pixel areas that are sequentially arranged, first pixels and first scan lines in the first pixel area, second pixels and second scan lines in the second pixel area, third pixels and third scan lines in the third pixel area, a first scan driver to drive the first scan lines, a second scan driver to drive the second scan lines, and a third scan driver to drive the third scan lines, wherein the second scan lines are sequentially driven, and the third scan lines are driven for a first period during which the second scan lines are driven, and the first scan lines are driven by the first scan driver for a second period, which is after the first period, during which the second scan lines are driven.

26 Claims, 15 Drawing Sheets

(51) Int. Cl.
  *G09G 3/3275* (2016.01)
  *H04N 13/344* (2018.01)
  *H04N 13/356* (2018.01)
  *H04N 13/359* (2018.01)
(52) U.S. Cl.
  CPC ... *H04N 13/356* (2018.05); *G09G 2310/0213* (2013.01); *G09G 2310/0218* (2013.01); *G09G 2310/08* (2013.01); *G09G 2320/0257* (2013.01); *H04N 13/359* (2018.05)
(58) Field of Classification Search
  USPC .................................. 348/51, 54; 527/71
  See application file for complete search history.

(56) References Cited

U.S. PATENT DOCUMENTS

| | | | |
|---|---|---|---|
| 9,286,831 | B2 | 3/2016 | Qing et al. |
| 2004/0189583 | A1 | 9/2004 | Park et al. |
| 2005/0024301 | A1 | 2/2005 | Funston |
| 2005/0078076 | A1 | 4/2005 | Kim et al. |
| 2005/0270873 | A1 | 12/2005 | Lee et al. |
| 2006/0017666 | A1 | 1/2006 | Kim et al. |
| 2006/0139294 | A1 | 6/2006 | Tanaka et al. |
| 2006/0256066 | A1 | 11/2006 | Moon |
| 2006/0267623 | A1 | 11/2006 | Yoo |
| 2007/0040792 | A1 | 2/2007 | Kwag et al. |
| 2007/0159441 | A1 | 7/2007 | Yang et al. |
| 2010/0020059 | A1 | 1/2010 | Suh |
| 2010/0073335 | A1 | 3/2010 | Min et al. |
| 2010/0079356 | A1 | 4/2010 | Hoellwarth |
| 2010/0085335 | A1 | 4/2010 | Kato |
| 2010/0097366 | A1 | 4/2010 | Kitayama et al. |
| 2010/0188375 | A1 | 7/2010 | Lee et al. |
| 2011/0227889 | A1 | 9/2011 | Choi |
| 2013/0293597 | A1* | 11/2013 | Mori ............... G09G 3/007 345/690 |
| 2013/0335537 | A1* | 12/2013 | Goro ............... H04N 13/31 348/54 |
| 2013/0335538 | A1* | 12/2013 | Shestak ........... H04N 13/31 348/54 |
| 2014/0022289 | A1 | 1/2014 | Lee et al. |
| 2014/0268356 | A1 | 9/2014 | Bolas et al. |
| 2014/0368417 | A1* | 12/2014 | Yamazaki ........ H01L 21/02631 345/92 |
| 2015/0002558 | A1 | 1/2015 | Kumeta et al. |
| 2015/0109353 | A1 | 4/2015 | Yu et al. |
| 2015/0137118 | A1 | 5/2015 | Umezaki et al. |
| 2015/0154902 | A1* | 6/2015 | Lee ................. G09G 3/20 345/213 |
| 2015/0154925 | A1* | 6/2015 | Koyama ........... G06F 3/0421 345/174 |
| 2015/0187262 | A1 | 7/2015 | Eom |
| 2015/0187320 | A1 | 7/2015 | Ren |
| 2015/0243238 | A1 | 8/2015 | Jung et al. |
| 2015/0331482 | A1* | 11/2015 | Sawada ............ G06F 3/011 345/156 |
| 2016/0005351 | A1* | 1/2016 | Jeon ................ G09G 3/2085 345/204 |
| 2016/0014402 | A1* | 1/2016 | Lee ................. G09G 5/18 348/51 |
| 2016/0111053 | A1* | 4/2016 | Yamazaki ........ H01L 27/1225 345/205 |
| 2016/0117987 | A1 | 4/2016 | Byun |
| 2016/0140921 | A1* | 5/2016 | Koyama ........... G06F 3/0421 345/204 |
| 2016/0190166 | A1* | 6/2016 | Kim ............... H01L 27/1255 257/71 |
| 2016/0299683 | A1 | 10/2016 | Kwon et al. |
| 2016/0343315 | A1* | 11/2016 | Richards .......... G09G 3/20 345/689 |
| 2016/0364198 | A1 | 12/2016 | Song et al. |
| 2017/0052635 | A1 | 2/2017 | Yu et al. |
| 2017/0221411 | A1* | 8/2017 | Chang ............. G09G 3/20 345/690 |
| 2017/0357091 | A1* | 12/2017 | Jin ................. G02B 5/201 345/214 |
| 2018/0059420 | A1 | 3/2018 | Woo et al. |
| 2018/0075808 | A1* | 3/2018 | Yamashita ........ G09G 3/3266 345/698 |
| 2018/0158409 | A1 | 6/2018 | Byun et al. |
| 2018/0190202 | A1 | 7/2018 | Kong |
| 2018/0197480 | A1 | 7/2018 | Choi et al. |
| 2018/0197481 | A1 | 7/2018 | Choi et al. |
| 2018/0197482 | A1 | 7/2018 | Choi et al. |

FOREIGN PATENT DOCUMENTS

| | | |
|---|---|---|
| KR | 10-2004-0024915 A | 3/2004 |
| KR | 10-2013-0000020 A | 1/2013 |
| KR | 10-1341010 B1 | 12/2013 |
| KR | 10-2015-0078980 A | 7/2015 |
| KR | 10-2016-0070445 A | 6/2016 |
| KR | 10-2016-0120143 | 10/2016 |
| KR | 10-2018-0082692 | 7/2018 |
| KR | 10-2018-0082698 | 7/2018 |
| KR | 10-2018-0083237 | 7/2018 |
| WO | 2015/137706 A1 | 9/2015 |

OTHER PUBLICATIONS

Office action issued in related U.S. Appl. No. 15/835,170 by the UPSTO, dated Jul. 11, 2019, 13 pages.
Office action issued in U.S. Appl. No. 15/864,914 by the USPTO, dated May 8, 2019, 32 pages.
Office action issued in U.S. Appl. No. 15/864,971 by the USPTO, dated Sep. 9, 2019, 20 pages.
Final Office action issued in U.S. Appl. No. 15/864,914 by the USPTO, dated Sep. 12, 2019, 37 pages.
EPO Office Action dated Nov. 25, 2019, corresponding to European Patent Application No. 18151000.9, 6 pages.
Notice of Allowance issued in U.S. Appl. No. 15/864,914 by the USPTO, dated Feb. 5, 2020, 13 pages.

* cited by examiner

DISPLAY DEVICE AND DRIVING METHOD THEREOF

CROSS-REFERENCE TO RELATED APPLICATION

This application claims priority to and the benefit of Korean Patent Application No. 10-2017-0003500 filed in the Korean Intellectual Property Office on Jan. 10, 2017, the entire contents of which are incorporated herein by reference.

BACKGROUND

1. Field

Embodiments of the present invention relate to a display device and a driving method thereof.

2. Description of the Related Art

Recently, various types of electronic devices that can be directly worn on the body have been developed. Such devices are typically called wearable electronic devices.

As an example of wearable electronic devices, a head mounted display device (hereinafter, abbreviated as HMD) displays a realistic image, and supplies a high degree of immersion. Such a HMD is used for various purposes, such as watching movies and the like.

SUMMARY

Embodiments of the present invention provide a display device with improved display quality and a driving method thereof.

A display device according to an embodiment of the present invention includes a display area configured to display an image according to a first mode and a second mode in different areas, wherein the display area includes a first pixel area, a second pixel area, and a third pixel area that are sequentially arranged, first pixels and first scan lines in the first pixel area, second pixels and second scan lines in the second pixel area, third pixels and third scan lines in the third pixel area, a first scan driver configured to drive the first scan lines, a second scan driver configured to drive the second scan lines, and a third scan driver configured to drive the third scan lines, wherein, according to the second mode, the second scan lines are sequentially driven by the second scan driver, and the third scan lines are driven by the third scan driver for a first period during which the second scan lines are driven, and wherein, according to the second mode, the first scan lines are driven by the first scan driver for a second period, which is after the first period, during which the second scan lines are driven.

At least some of the second scan lines adjacent to the first pixel area may be driven in the first period, and at least some others of the second scan lines adjacent to the third pixel area may be driven in the second period.

The first scan lines, the second scan lines, and the third scan lines may be sequentially driven by the first scan driver, the second scan driver, and the third scan driver according to the first mode.

The display device may further include a timing controller configured to provide a first start signal, a second start signal, and a third start signal to the first scan driver, the second scan driver, and the third scan driver, respectively.

The timing controller may be configured to sequentially supply the first start signal, the second start signal, and the third start signal according to the first mode.

The timing controller may be configured to concurrently supply the second and third start signals according to the second mode, and to then supply the first start signal.

A first second scan line of the second scan lines may be adjacent to a last first scan line of the first scan lines, and a last second scan line of the second scan lines may be adjacent to a first third scan line of the third scan lines.

The second and third scan drivers may be configured to concurrently supply a scan signal to the first second scan line of the second scan lines and the first third scan line of the third scan lines according to the second mode.

k first scan lines (k being a natural number of 2 or more) may be arranged in the first pixel area, n second scan lines (n being a natural number of 2 or more) may be arranged in the second pixel area, and the first and second scan drivers may be configured to concurrently supply a scan signal to a first first scan line of the first scan lines and an n−k+1-th second scan line of the second scan lines according to the second mode.

The display device may further include data lines in the display area to cross the first scan lines, the second scan lines, and the third scan lines, and a data driver for providing a data signal to the data lines.

According to the second mode, the data driver may be configured to supply, through the data lines, the same data signal to ones of the second pixels and ones of the third pixels positioned in a first horizontal line of the second pixel area and a first horizontal line of the third pixel area, respectively, and may be configured to supply the same data signal to ones of the first pixels and ones of the second pixels positioned in a last horizontal line of the first pixel area and a last horizontal line of the second pixel area, respectively.

The display device may further include first emission control lines connected to the first pixels, second emission control lines connected to the second pixels, third emission control lines connected to the third pixels, a first emission control driver configured to provide an emission control signal to the first emission control lines, a second emission control driver configured to provide an emission control signal to the second emission control lines, and a third emission control driver configured to provide an emission control signal to the third emission control lines.

The first emission control lines, the second emission control lines, and the third emission control lines may be sequentially driven by the first emission control driver, the second emission control driver, and the third emission control driver according to the first mode.

According to the second mode, the second emission control lines may be sequentially driven by the second emission control driver, the third emission control lines may be driven by the third emission control driver for a third period during which the second emission control lines are driven, and the first emission control lines may be driven by the first emission control driver for a fourth period, which is after the third period, during which the second emission control lines are driven.

The image may be displayed in the first pixel area, the second pixel area, and the third pixel area of the display area according to the first mode, and the image may be displayed in the second pixel area of the display area, and an image including a part of the image is displayed in each of the first and third pixel areas, according to the second mode.

The display device may be configured to be driven in the second mode when mounted on a wearable device at least partially covering the first and third pixel areas, and is otherwise configured to be driven in the first mode.

According to the second mode, the second pixel area may be divided into a left eye area in which a left-eye image is displayed, and a right eye area in which a right-eye image is displayed, and a black grayscale may be displayed between the left eye area and the right eye area, in a border area between the first and second pixel areas, and in a border area between the second and third pixel areas.

A driving method of a display device according to an embodiment of the present invention includes a first pixel area, a second pixel area, and a third pixel area that are sequentially arranged, the method including sequentially providing a scan signal to the first pixel area, the second pixel area, and the third pixel area in a first mode, and sequentially providing a scan signal to the second pixel area, and providing a scan signal to the third pixel area for a first period during which the scan signal is supplied to the second pixel area in a second mode, and providing a scan signal to the first pixel area for a second period, which is after the first period, during which a scan signal is supplied to the second pixel area, in the second mode.

The driving method may further include concurrently providing a scan signal to a first scan line of the second pixel area and to a first scan line of the third pixel area in the second mode.

The driving method may further include concurrently providing a scan signal to a last scan line of the first pixel area and to a last scan line of the second pixel area in the second mode.

The driving method may further include driving j (j is a natural number of 2 or more) third scan lines in the third pixel area along with j second scan lines adjacent to the first pixel area in the first period, and driving k (k is a natural number of 2 or more) first scan lines in the first pixel area along with k second scan lines adjacent to the third pixel area in the second period.

The driving method may further include displaying an image in the second pixel area in the second mode.

The driving method may further include displaying a portion of the image in the second pixel area that is adjacent to the third pixel area in the first pixel area in the second mode, and displaying another portion of the image in the second pixel area that is adjacent to the first pixel area in the third pixel area in the second mode.

The driving method may further include providing a data signal corresponding to a left-eye image to a left eye area of the second pixel area in the second mode, and providing a data signal corresponding to a right-eye image to a right eye area of the second pixel area in the second mode.

The driving method may further include providing a data signal corresponding to a black grayscale to an area between the left eye area and the right eye area, to a border area between the first and second pixel areas, and to a border area between the second and third pixel areas, in the second mode.

The driving method may further include activating the second mode when the display device is mounted on a wearable device covering the first and third pixel areas.

The driving method may further include display an image in the first pixel area, the second pixel area, and the third pixel area according to the first mode.

According to an embodiment of the present invention, for a period during which a display device is mounted on a wearable device and is driven in a second mode, second scan lines of a visible display area are driven, and first and third scan lines of a non-visible display area are driven for at least some period while the second scan lines are driven. Accordingly, a time required for the driving may be secured, and characteristics of the driving transistors provided in pixels may be prevented from being differently set in a visible display area and a non-visible display area. Accordingly, display quality of the display device may be improved.

In addition, for a period during which a display device is driven in a second mode, an image of a valid image of the visible display area is displayed in each of non-visible display areas respectively located at opposite sides of the visible display area. Accordingly, an image sticking phenomenon may be reduced or minimized at a border area between the visible display area and the non-visible display area, and light leakage interference caused by driving of the non-visible display area may be reduced or prevented.

DETAILED DESCRIPTION

Figure 1A:
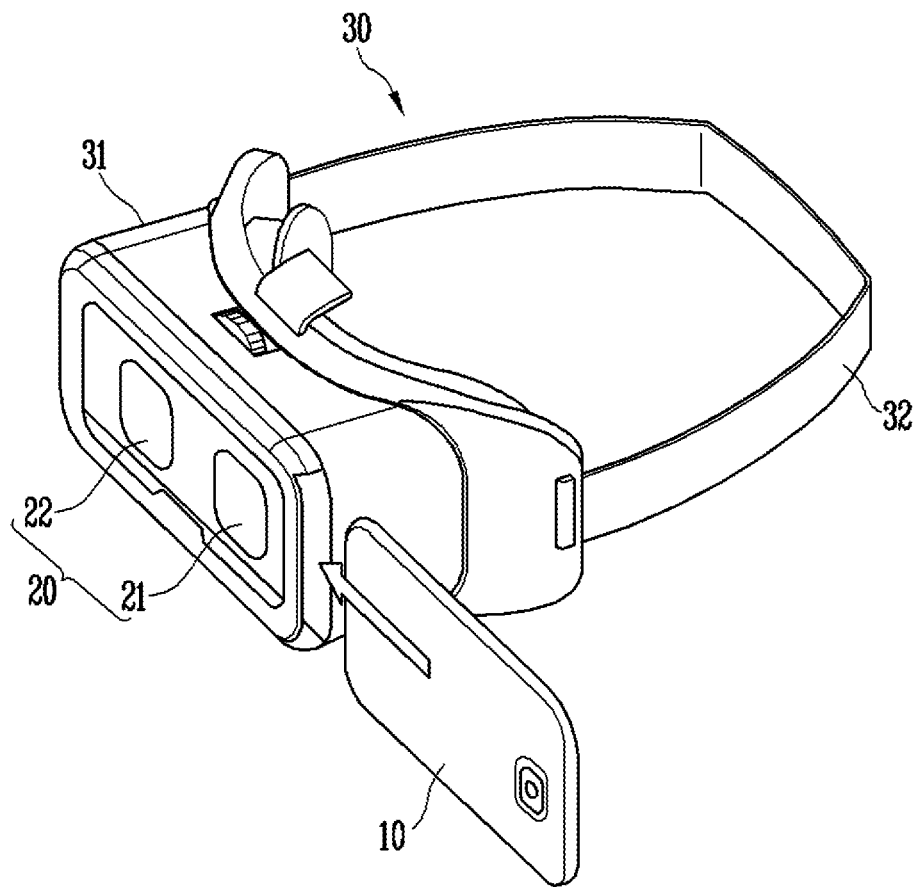
FIGS. 1A to 1C show a wearable device according to an embodiment of the present invention, and how a display device is mounted on the wearable device.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present invention described herein may be implemented using any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
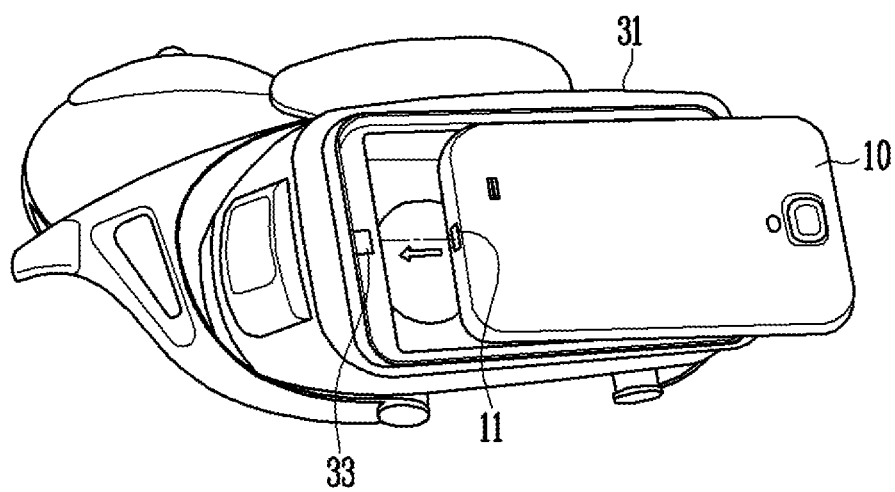
Figure 1C:
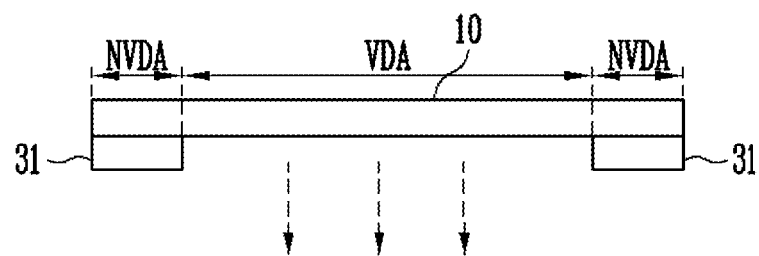

FIGS. 1A to 1C show a wearable device according to an embodiment of the present invention, and how a display device is mounted on the wearable device. In FIGS. 1A to 1C, a HMD is illustrated as an embodiment of the wearable device, but the wearable device according to the present invention is not limited thereto.

Referring to FIGS. 1A and 1B, the wearable device 30 according to the present embodiment may include a frame 31. A band 32 may be connected to the frame 31, and a user may wear the frame 31 around the head by using the band 32. The frame 31 has a structure on which the display device 10 can be detachably mounted.

In some embodiments, the display device 10 that can be mounted on the wearable device 30 may be a smartphone, but it is not limited thereto. For example, the display device 10 may be any electronic device that can be mounted on the wearable device 30 and that includes a display means, such as a tablet PC, an e-book reader, a computer, a workstation, a personal digital assistant (PDA), a portable multimedia player (PMP), a camera, and the like.

In some embodiments, when the display device 10 is mounted on the frame 31, a connecting portion 11 of the display device 10 and a connecting portion 33 of the frame 31 may be electrically connected to each other. Accordingly, communication between the wearable device 30 and the display device 10 may be made. In order to control the display device 10 mounted on the frame 31, the wearable device 30 may include at least one of a touch sensor, a button, and a wheel key.

When the display device 10 is mounted on the wearable device 30, the display device 10 may be operated as a HMD device. For example, the display device 10 may be driven in a first mode when separated from the wearable device 30. When mounted on the wearable device 30, the display device 10 may be driven in a second mode, in which a valid image (e.g., an intended image) is displayed in the area that is different from that in the first mode. In some embodiments, the first mode may be a normal display mode (for example, a normal mode) in which an image is displayed in the entire display area of the display device 10, while the second mode of the display device 10 may be a partial display mode (for example, a VR mode) in which an image is displayed only in some of the display area.

In some embodiments, a driving mode of the display device 10 may be automatically or manually switched. For example, when the display device 10 is mounted on the wearable device 30, the driving mode of the display device 10 may be automatically switched to the second mode, or may be switched to the second mode by the user's setting. However, when the display device 10 is separated from the wearable device 30, the driving mode of the display device 10 may be automatically switched to the first mode, or may be switched to the first mode by the user's setting.

In some embodiments, the wearable device 30 may include a lens 20 that corresponds to the user's eyes. For example, the wearable device 30 may include a left eye lens 21 and a right eye lens 22 that respectively correspond to the user's left eye and right eye. However, the present invention is not limited to the wearable device 30 that includes the left eye lens 21 and the right eye lens 22. For example, a wearable device 30 according to another embodiment may include an integrated lens 20 such that the left eye and the right eye can concurrently or simultaneously see the same image. In some embodiments, the lens 20 may be a fisheye lens or a wide-angle lens so as to improve the user's field of view (FOV), but it is not limited thereto.

When the display device 10 is fixed to the frame 31, the user can see an image that is displayed by the display device 10 through the lens 20. Accordingly, it is possible to achieve the effect of viewing a video image on a large screen at a certain distance.

Referring to FIG. 1C, when the display device 10 is mounted on the wearable device 30, some areas of the display device 10 may be covered by the frame 31. For example, when the display device 10 is mounted on the wearable device 30, some of the display area of the display device 10 may be covered by the frame 31.

For example, after the display device 10 is mounted on the wearable device 30, a center portion of the display area of the display device 10, which includes areas recognized by the user through the lens 20 of the wearable device 30, may become a visible display area VDA. In addition, remaining portions of the display area of the display device 10, for example, an outer part(s) of the display area may become a non-visible display area NVDA that is covered by the frame 31.

In some embodiments, the center portion of the display device 10 may be divided into a visible display area VDA and a non-visible area NVDA so that a more vivid image can be displayed to the user. For example, an area of the center portion of the display device 10, which corresponds to each of the left eye lens 21 and the right eye lens 22, may be set to the visible display area VDA, while the other area thereof may be set to the non-visible display area NVDA. In this case, the image displayed in the visible display area VDA can be controlled according to each of the left eye lens 21 and the right eye lens 22, respectively, thereby enabling realization of a 3D image.

When the display device 10 is mounted on the wearable device 30 to be driven in the second mode, a valid image can be displayed in the visible display area VDA of the center portion. In addition, in the non-visible display area NVDA, the image might not be displayed, or a black or dummy image may be displayed.

On the other hand, when the display device 10 is separated from the wearable device 30 to be driven in the first mode, the entire display area of the display device 10 may be recognized by the user. That is, when the display device 10 is separated from the wearable device 30, the entire display area may become the visible display area VDA. In this case, the valid image can be displayed in the entire display area of the display device 10.

That is, the display device 10 according to the present embodiment may be differently driven according to the first and second modes. For example, the display device 10 may display the valid image in different areas depending on whether the display device 10 is in the first mode or in the second mode.

As in the present embodiment, when the display device 10 is used along with the wearable device 30, various types of images can be experienced. However, because the area for displaying the valid image when the display device 10 is driven in the first mode is different from the area for displaying the valid image when the display device 10 is driven in the second mode, a border line between the visible display area VDA and the non-visible display area NVDA may be recognized when the driving mode of the display device 10 is switched.

For example, suppose that the display device 10 displays an image only in the visible display area VDA of the center portion, and that the driving of the non-visible display area NVDA is stopped, hysteresis of the driving transistors provided in pixels of the visible display area VDA may be different from that of the driving transistors provided in pixels of the non-visible display area NVDA. Accordingly, when the display device 10 is switched to the first mode after it is driven in the second mode for a period (e.g., a predetermined period), luminance deviation may be generated between the visible display area VDA, which has been driven as the display area in the second mode, and the display area that has been the non-visible display area NVDA, and thus a border line may be recognized.

Accordingly, in embodiments to be described below, a display device and a driving method thereof are proposed, which can reduce or prevent recognition of a border line between a plurality of areas forming the display area, and which can reduce, prevent, or minimize an image sticking or light leakage interference from being generated.

Figure 2:
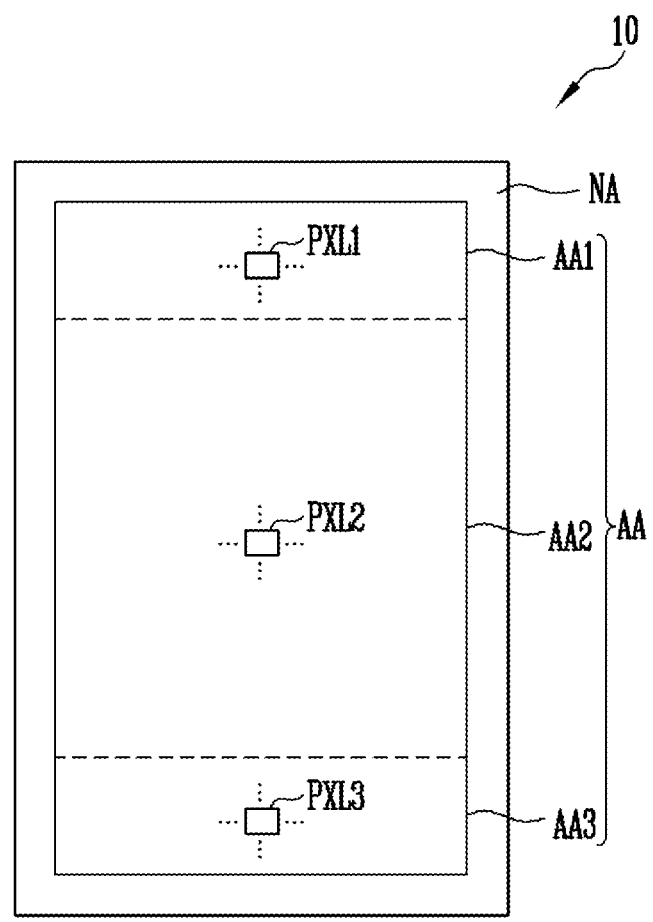
FIG. 2 schematically shows a display device according to an embodiment of the present invention.

FIG. 2 schematically shows a display device according to an embodiment of the present invention.

Referring to FIG. 2, the display device 10 according to the present embodiment includes a display area AA and a peripheral area NA. In some embodiments, the display area AA may be an active area in which a plurality of pixels PXL1, PXL2, and PXL3 are provided to display an image. The peripheral area NA may be a non-active area around the display area AA, and may correspond to a portion of the display device 10 not including the display area AA.

The display area AA may include at least two pixel areas AA1, AA2, and AA3 that are arranged adjacent to each other. For example, the display area AA may include first, second, and third pixel areas AA1, AA2, and AA3 that are sequentially arranged from one side of the display device 10. The plurality of pixels PXL1, PXL2, and PXL3 may be respectively provided in the pixel areas AA1, AA2, and AA3. These pixels PXL1, PXL2, and PXL3 may be used to display an image in the display area AA.

In some embodiments, the first pixel area AA1 is positioned at one side of the second pixel area AA2, and the third pixel area AA3 may be positioned at the other side of the second pixel area AA2. For example, the first and third pixel areas AA1 and AA3 may be positioned at opposite sides of the second pixel area AA2. For example, the first pixel area AA1 may be located at an upper end of the second pixel area AA2, and the third pixel area AA3 may be located at a lower end of the second pixel area AA2. In this case, the second pixel area AA2 may be positioned between the first pixel area AA1 and the third pixel area AA3.

In some embodiments, at least two of the pixel areas AA1, AA2, and AA3 may have different sizes. For example, the second pixel area AA2 may be larger than the first pixel area AA1 and/or the third pixel area AA3. For example, the second pixel area AA2 may have the largest size of the pixel areas, and the first pixel area AA1 and the third pixel area AA3 may have the same size. However, the present invention is not limited thereto. For example, in another embodiment, all of the pixel areas AA1, AA2, and AA3 may have the same size.

In addition, in some embodiments, the first pixel area AA1, the second pixel area AA2, and the third pixel area AA3 are shown in FIG. 2, to have the same width, but the present invention is not limited thereto. For example, the first pixel area AA1 and/or the third pixel area AA3 may have a shape such that a width of the first pixel area AA1 and/or the third pixel area AA3 gradually decreases in a direction away from the second pixel area AA2. Alternatively, the first pixel area AA1 and/or the third pixel area AA3 may have a fixed width that is smaller than the width of the second pixel area AA2.

Additionally, in some embodiments, at least two of the pixel areas AA1, AA2, and AA3 may have the same width and/or length, or may have different sizes even if they have the same number of horizontal pixel columns and/or the same number of scan lines. For example, the first pixel area AA1 and the third pixel area AA3 may have the same width and/or length and the same number of horizontal pixel columns and/or the same number of scan lines, but their sizes may be different. For example, even if the first pixel area AA1 and the third pixel area AA3 have substantially the same width and/or length, when a recess portion, an opening, or a dummy area (e.g., an area in which first pixels PXL1 are not provided) is in one area of the first pixel area AA1, the first pixel area AA1 may be effectively smaller than the third pixel area AA3. That is, in the present invention, the shapes or sizes of the first pixel area AA1, the second pixel area AA2, and/or the third pixel area AA3 (e.g., the widths, lengths, and/or sizes) are not specifically limited, and may be variously modified.

In some embodiments, the second pixel area AA2 positioned at a center portion of the display area AA may correspond to the visible display area VDA shown in FIG. 1C. In addition, the first pixel area AA1 and third pixel area AA3 positioned at edges of the display area AA may correspond to the non-visible display area NVDA shown in FIG. 1C.

For example, when the display device 10 is driven in a second mode, a user might not see an image that is displayed in the first pixel area AA1 and the third pixel area AA3, and may see only an image that is displayed in the second pixel area AA2. In this case, the display device 10 displays a valid image only in the second pixel area AA2. In the present embodiment, when the display device 10 is driven in the second mode, a dummy image (e.g., a predetermined dummy image) may be displayed in the first and third pixel areas AA1 and AA3, as will be described below in detail.

When the display device 10 is driven in a first mode, the user may see an image displayed in the first to third pixel areas AA1, AA2, and AA3. That is, when the display device 10 is driven in the first mode, the valid image may be displayed in the entire display area AA that includes the first to third pixel areas AA1, AA2, and AA3. For example, when the display device 10 is driven in the first mode, images displayed in the first to third pixel areas AA1, AA2, and AA3 may be connected to effectively implement a single screen in the entire display area AA.

In some embodiments, a plurality of first pixels PXL1 may be provided in the first pixel area AA1, while a plurality of second pixels PXL2 may be provided in the second pixel area AA2. In addition, a plurality of third pixels PXL3 may be provided in the third pixel area AA3.

The pixels PXL1, PXL2, and PXL3 emit light (e.g., with a predetermined luminance) according to various kinds of driving powers and/or driving signals that are supplied from drivers. For this purpose, each of the pixels PXL1, PXL2, and PXL3 may include at least one light emitting element (e.g., organic light emitting diode).

The peripheral area NA may be a non-display area in which an image is not displayed. Components for driving the pixels PXL1, PXL2, and PXL3 may be in the peripheral area NA. For example, wires, pads, and/or at least one driver may be in the peripheral area NA.

In some embodiments, the peripheral area NA may be located around the display area AA to surround at least some of the display area AA. For example, the peripheral area NA may be located outside the pixel areas AA1, AA2, and AA3, which form the display area AA, to surround the entire display area AA.

Figure 3:
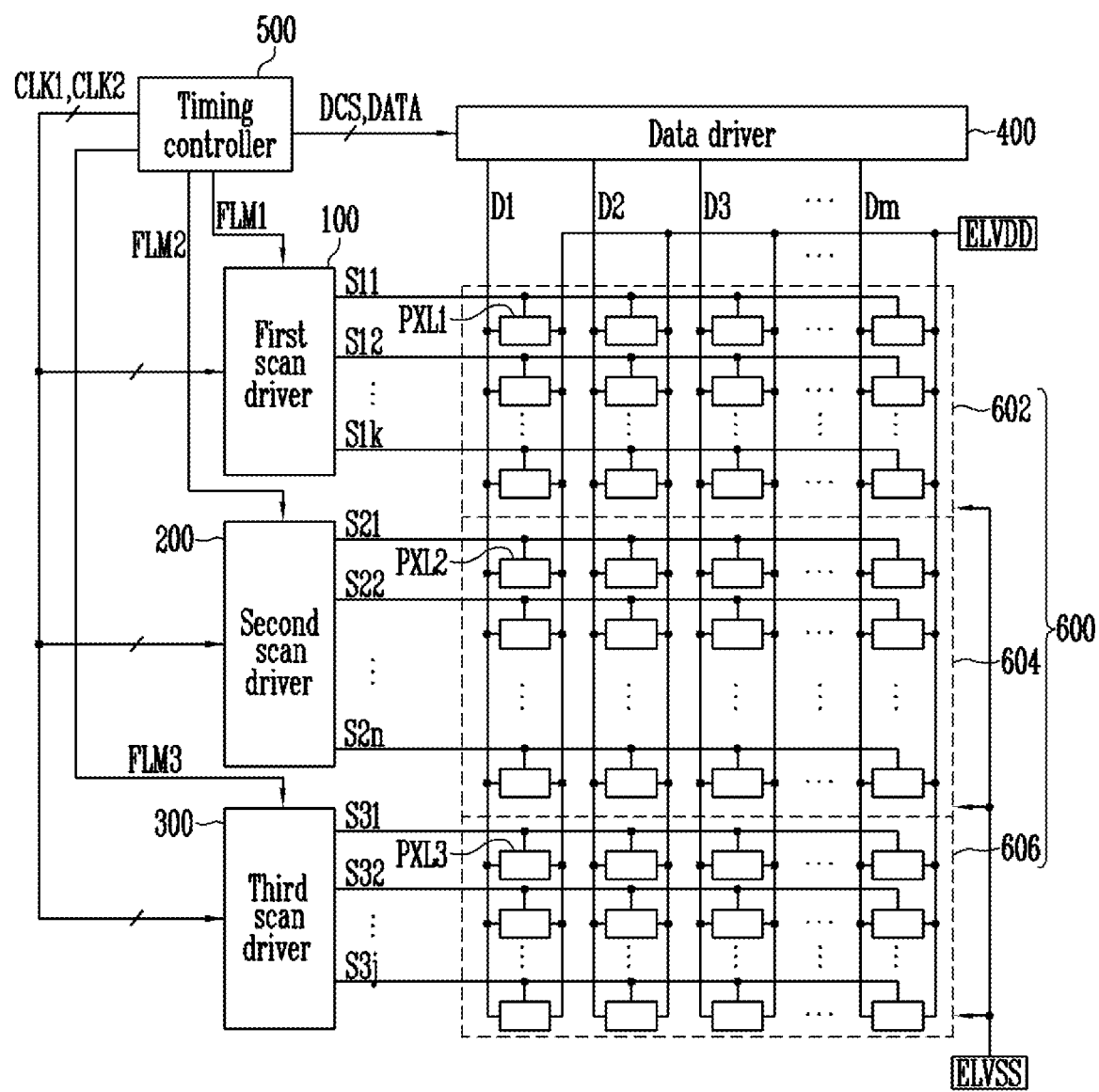
FIG. 3 shows a display device according to an embodiment of the present invention.

FIG. 3 shows a display device according to an embodiment of the present invention. In some embodiments, as shown in FIG. 1A to FIG. 2, the display device illustrated in FIG. 3 includes a plurality of pixels areas, and may be a display device that can be detachable from the wearable device. That is, the display device according to the current embodiment of FIG. 3 may be driven in a second mode to display a valid image in some of a display area when mounted on a wearable device, and may be driven in a first mode in which a valid image is displayed in the entire display area when separated from the wearable device.

Referring to FIG. 3, the display device according to the present embodiment includes a first scan driver 100, a second scan driver 200, a third scan driver 300, a data driver 400, a timing controller 500, and a display area 600.

The display area 600 includes at least two pixel areas 602, 604, and 606. For example, the display area 600 may include a first pixel area 602, a second pixel area 604, and a third pixel area 606.

In some embodiments, the first pixel area 602, the second pixel area 604, and the third pixel area 606 may be sequentially arranged such that the first pixel area 602 and the third pixel area 606 are adjacent the second pixel area 604. For example, the pixel areas 602, 604, and 606 may be sequentially arranged in the order of the first pixel area 602, the second pixel area 604, and the third pixel area 606 from one side of the display area 600 (e.g., an upper end). In this case, the second pixel area 604 may include a center portion of the display area 600. In addition, the first pixel area 602 may be positioned adjacent to a first horizontal line of the second pixel area 604, and the third pixel area 606 may be positioned adjacent to a last horizontal line of the second pixel area 604. Accordingly, a first second scan line S21 of second scan lines S21 to S2$n$ (n being a natural number of 2 or more) may be located adjacent to a last first scan line S1$k$ of first scan lines S11 to S1$k$ (k being a natural number of 2 or more), and a last second scan line S2$n$ of the second scan lines S21 to S2$n$ may be located to be adjacent to a first third scan line S31 of third scan lines S31 to S3$j$ (j being a natural number of 2 or more).

In the present embodiment, the display area 600 may display a valid image in different areas according to a plurality of different modes. For example, the display area 600 may display, according to the first mode (e.g., normal mode), the valid image in the entire area including the first to third pixel areas 602, 604, and 606. That is, when the display device is driven in the first mode, a valid image may be displayed in the first pixel area 602, the second pixel area 604, and the third pixel area 606. For example, when the display device is driven in the first mode, one uniform screen may be implemented by the first to third pixel areas 602, 604, and 606 that are connected to each other. In this case, a user may see all images that are displayed in the first pixel area 602, the second pixel area 604, and the third pixel area 606.

On the other hand, the display area 600 may display a valid image only in some areas according to a second mode (e.g., VR mode). For example, when the display device is driven in the second mode, a valid image is displayed in the second pixel area 604 including a center portion (e.g., a center portion corresponding to the lens 20 shown in FIG. 1A), while a dummy image may be displayed in the first and third pixel areas 602 and 606 that are positioned at opposite sides of the second pixel area 604. When the display device is driven in the second mode, a dummy image displayed in the first pixel area 602 and the third pixel area 606 may not be visible to the user because it is covered by the frame 31 or the like shown in FIG. 1A.

On the other hand, in a comparative embodiment, for a period during which the display device is driven in the second mode, driving of the first and third pixel areas 602 and 606 may be stopped. For example, while the display device is driven in the second mode, a scan signal might not be supplied to scan lines S11 to S1$k$ and S31 to S3$j$ that are respectively connected to first and third pixels PXL1 and PXL3. In this case, the data signal is not provided to the first and third pixels PXL1 and PXL3.

However, as described above, when the data signal is not provided to the first and third pixels PXL1 and PXL3 according to the specific mode (e.g., the second mode), a characteristic deviation may be generated between driving transistors included in the first and third pixels PXL1 and PXL3 and driving transistors included in the second pixels PXL2 provided in the second pixel area 604. Accordingly, when a driving mode of the display device is switched from the second mode to the first mode, luminance deviation may be generated for each of the pixel areas 602, 604, and 606. Such luminance deviation may cause border lines between the pixel areas 602, 604, and 606 to appear inside the display area 600, and the pixel areas 602, 604, and 606 may be, for example, recognized by the user as stains in the form of blocks.

On the contrary, in the present embodiment, even when the display device is driven in the second mode, the first and third pixel areas 602 and 606 are driven such that an image (e.g., a predetermined image or a dummy image) is displayed.

Accordingly, characteristic deviation of the pixels PXL1, PXL2, and PXL3 (e.g., characteristic deviation of the driving transistors) may be reduced or prevented from being generated between the pixel areas 602, 604, and 606. Accordingly, according to the present embodiment, when the display device is driven in the first mode, the pixel areas 602, 604, and 606 might not be recognized as stains in the form of blocks to the user, thereby improving display quality.

A plurality of first pixels PXL1 are provided in the first pixel area 602. The first pixels PXL1 are respectively connected to the first scan lines S11 to S1$k$ and data lines D1 to Dm. In some embodiments, the first scan lines S11 to S1$k$ may be provided in the first pixel area 602 to extend along a first direction (e.g., along a horizontal direction). In some embodiments, the data lines D1 to Dm may be provided in the display area 600 to cross the first to third scan lines S11 to S1$k$, S21 to S2$n$, and S31 to S3$j$ along a second direction crossing the first direction (e.g., along a vertical direction).

The first pixels PXL1 are selected when a first scan signal is supplied to the first scan lines S11 to S1$k$, and receive a data signal from the data lines D1 to Dm. After receiving the data signal, the first pixels PXL1 emit light with luminance corresponding to the data signal while controlling a driving current flowing from a first power supply ELVDD to a second power supply ELVSS via an organic light emitting diode.

A plurality of second pixels PXL2 are provided in the second pixel area 604. The second pixels PXL2 are connected to the second scan lines S21 to S2$n$ and the data lines D1 to Dm. In some embodiments, the second scan lines S21 to S2$n$ are provided in the second pixel area 604 to extend along the first direction (e.g., the horizontal direction), and may cross the data lines D1 to Dm. In some embodiments, the number of the second scan lines S21 to S2$n$ in the second pixel area 604 may be greater than the number of the first and/or third scan lines S11 to S1$k$ and/or S31 to S3$j$ in the first and/or third pixel areas 602 and 606, but the second scan lines S21 to S2$n$ are not limited thereto.

The second pixels PXL2 are selected when a second scan signal is supplied to a respective one of the second scan lines S21 to S2$n$, and receive the data signal from the data lines D1 to Dm. After receiving the data signal, the second pixels PXL2 emit light with luminance corresponding to the data signal while controlling the driving current flowing from the first power supply ELVDD to the second power supply ELVSS via the organic light emitting diode.

A plurality of third pixels PXL3 are provided in the third pixel area 606. The third pixels PXL3 are connected to the third scan lines S31 to S3$j$ and the data lines D1 to Dm. In some embodiments, the third scan lines S31 to S3$j$ are provided in the third pixel area 606 to extend along the first direction (e.g., the horizontal direction), and may cross the data lines D1 to Dm.

The third pixels PXL3 are selected when a third scan signal is supplied to a respective one of the third scan lines S31 to S3$j$, and receive the data signal from the data lines D1 to Dm. After receiving the data signal, the third pixels PXL3 emit light with luminance corresponding to the data signal while controlling the driving current flowing from the first power supply ELVDD to the second power supply ELVSS via the organic light emitting diode.

In the present embodiment, the first to third pixels PXL1, PXL2, and PXL3 may be implemented with various forms of circuits. For example, the first to third pixels PXL1, PXL2, and PXL3 may include various pixel circuits that include driving transistors.

Additionally, the number of the first scan lines S11 to S1$k$, the second scan lines S21 to S2$n$, and/or the third scan lines S31 to S3$j$, which are respectively in the first, second, and third pixel areas 602, 604, and 606, may be variously modified.

For example, the number of the first scan lines S11 to S1$k$ may be set to at least two or more in consideration of the area overlapped with the frame 31 of the wearable device 30. For example, a hundred or more of first scan lines S11 to S1$k$ may be in the first pixel area 602. Similarly, the number of the third scan lines S31 to S3$j$ may be set to at least two or more in consideration of the area overlapped with the frame 31 of the wearable device 30. For example, a hundred or more third scan lines S31 to S3$j$ may be in the third pixel area 606.

The first scan driver 100 supplies the first scan signal to the first scan lines S11 to S1$k$ to drive the first scan lines S11 to S1$k$. When the first scan signal is supplied to the first scan lines S11 to S1$k$, the first pixels PXL1 are sequentially selected in a horizontal line unit. For this purpose, the first scan signal is set to a gate-on voltage that can turn on transistors (e.g., switching transistors) included in the first pixels PXL1.

The second scan driver 200 supplies the second scan signal to the second scan lines S21 to S2$n$ to drive the second scan lines S21 to S2$n$. When the second scan signal is supplied to the second scan lines S21 to S2$n$, the second pixels PXL2 are sequentially selected in a horizontal line unit. For this purpose, the second scan signal is set to a gate-on voltage that can turn on transistors (e.g., switching transistors) included in the second pixels PXL2.

The third scan driver 300 supplies the third scan signal to the third scan lines S31 to S3$j$ to drive the third scan lines S31 to S3$j$. When the third scan signal is supplied to the third scan lines S31 to S3$j$, the third pixels PXL3 are sequentially selected in a horizontal line unit. For this purpose, the third scan signal is set to a gate-on voltage that can turn on transistors (e.g., switching transistors) included in the third pixels PXL3.

The data driver 400 receives a data control signal DCS and image data DATA from the timing controller 500. The data driver 400 generates a data signal according to the data control signal DCS and the image data DATA, and supplies the generated data signal to the data lines D1 to Dm.

When the display device is driven in the first mode, the first scan driver 100, the second scan driver 200, and the third scan driver 300 may sequentially supply the first scan signal, the second scan signal, and the third scan signal. Then, the data signal from the data driver 400 is sequentially supplied to respective ones of the first pixels PXL1, the second pixels PXL2, and the third pixels PXL3, and accordingly, a predetermined valid image may be displayed in the entire display area 600.

On the other hand, when the display device is driven in the second mode, the second scan driver 200 may sequentially supply the second scan signal. Then, the data signal from the data driver 400 is sequentially supplied to the second pixels PXL2, and accordingly, a predetermined valid image may be displayed in the second pixel area 604.

However, in the present embodiment, when the display device is driven in the second mode, the third scan driver 300 may sequentially supply the third scan signal for some of the periods (e.g., a first period) during which the second scan signal is sequentially supplied. Then, the data signal from the data driver 400 is provided not only to the second pixels PXL2 of the corresponding horizontal line, but also to the third pixels PXL3 positioned in a certain horizontal line of the third display area 606. Accordingly, a dummy image corresponding to one area (e.g., a top area) of the valid image is displayed in the third display area 606.

In addition, when the display device is driven in the second mode, the first scan driver 100 may sequentially supply the first scan signal for a remainder of the periods (e.g., the second period after the first period) during which the second scan signal is sequentially supplied. Then, the data signal from the data driver 400 is provided not only to the second pixels PXL2 of the corresponding horizontal line, but also to the first pixels PXL1 positioned in a certain horizontal line of the first pixel area 602. Accordingly, the dummy image corresponding to another area (e.g., a bottom area) of the valid image is displayed in the first pixel area 602.

As described above, in the present embodiment, when the display device is driven in the second mode, the first and third pixels PXL1 and PXL3 are also driven to display the dummy image in the first and third pixel areas 602 and 606. Accordingly, characteristics of driving transistors included in ones of the pixels PXL1, PXL2, and PXL3 that are between the pixel areas 602, 604, and 606 may be reduced or prevented from being differently set while securing the time required for the driving. Accordingly, when the driving mode of the display device is switched from the second mode to the first mode, luminance deviation may be reduced or prevented from being generated between the pixel areas 602, 604, and 606, and thus border lines may not appear between the pixel areas 602, 604, and 606 in the display area 600.

The timing controller 500 generates clock signals CLK1 and CLK2, start signals FLM1, FLM2, and FLM3, and a data control signal DCS based on externally supplied timing signals. The clock signals CLK1 and CLK2 generated from the timing controller 500 are supplied to the first scan driver 100, the second scan driver 200, and the third scan driver 300. In addition, the first start signal FLM1 generated from the timing controller 500 is supplied to the first scan driver 100, the second start signal FLM2 is supplied to the second scan driver 200, and the third start signal FLM3 is supplied to the third scan driver 300. In addition, the data control signal DCS generated from the timing controller 500 is supplied to the data driver 400.

The first start signal FLM1 controls a supply timing of the first scan signals. The clock signals CLK1 and CLK2 supplied to the first scan driver 100 are used to shift the first start signal FLM1.

The second start signal FLM2 controls a supply timing of the second scan signals. The clock signals CLK1 and CLK2 supplied to the second scan driver 200 are used to shift the second start signal FLM2.

The third start signal FLM3 controls a supply timing of the third scan signals. The clock signals CLK1 and CLK2 supplied to the third scan driver 300 are used to shift the third start signal FLM3.

A source start signal, a source output enable signal, and a source sampling clock are included in the data control signal DCS. The source start signal controls a data sampling starting point of the data driver 400. The source sampling clock controls a sampling operation of the data driver 400 based on a rise time or a fall time. The source output enable signal controls an output timing of the data driver 400.

Additionally, the timing controller 500 rearranges the image data DATA and then transmits it to the data driver 400. For example, the timing controller 500 transforms, according to the first mode or second mode, the image data DATA such that the image data DATA is suitable for an area (e.g., a predetermined area) in which a valid image is to be displayed, and may transmit it to the data driver 400. Alternatively, the timing controller 500 may receive, from a host system, the image data DATA suitable for the area in which the valid image is to be displayed, and rearranges the image data DATA to transmit it to the data driver 400. Then, the data driver 400 generates a data signal corresponding to the image data DATA supplied from the timing controller 500.

As described above, when driven in the second mode, the display device according to the present embodiment displays, in the first and third pixel areas 602 and 606, the dummy image(s) corresponding to one area of, or respective areas of, the valid image to be displayed in the second pixel area 604. For example, for the period during which the display device is driven in the second mode, the first and third pixel areas 602 and 606 located at opposite sides of the second pixel area 604 may display a respective image, the images being displayed at opposite ends of the valid image displayed in the second pixel area 604.

According to the present embodiment, an image sticking, which can otherwise be generated at a border area between the visible display area VDA (e.g., the second pixel area 604) and the non-visible display area NVDA (e.g., the first and third pixel areas 602 and 606), can be reduced or minimized, and light leakage interference can be reduced or prevented. A detailed description regarding this will be described below.

Figure 4:
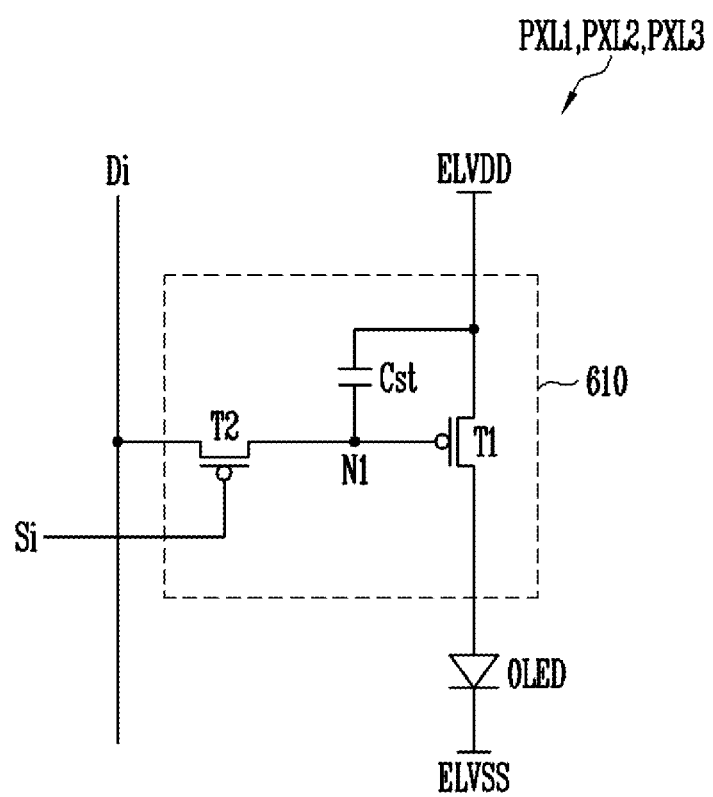
FIG. 4 shows an embodiment of a pixel illustrated in FIG. 3.

FIG. 4 shows an embodiment of the pixel illustrated in FIG. 3. For ease of description, any of the first to third pixels PXL1, PXL2, and PXL3 that is connected to an i-th (i is a natural number) data line Di and an i-th scan line Si (e.g., any of first scan lines S11 to S1$k$, second scan lines S21 to S2$n$, and third scan lines S31 to S3$j$) will be illustrated in FIG. 4.

Referring to FIG. 4, the pixels PXL1, PXL2, and PXL3 according to the present embodiment include an organic light emitting diode (OLED), and a pixel circuit 610 for controlling a driving current supplied to the organic light emitting diode (OLED).

An anode of the organic light emitting diode (OLED) is connected to the pixel circuit 610, while a cathode thereof is connected to a second power supply ELVSS. The organic light emitting diode (OLED) generates light (e.g., with a predetermined luminance) according to an amount of a driving current supplied from the pixel circuit 610.

The pixel circuit 610 controls, according to a data signal, the amount of the driving current flowing from a first power supply ELVDD to the second power supply ELVSS via the organic light emitting diode (OLED). For this purpose, the pixel circuit 610 includes a first transistor T1 and a second transistor T2.

The first transistor T1 (driving transistor) is connected between the first power supply ELVDD and the anode of the organic light emitting diode (OLED). In addition, a gate electrode of the first transistor T1 is connected to a first node N1. The first transistor T1 controls, according to a voltage of the first node N1, the amount of the driving current flowing from the first power supply ELVDD to the second power supply ELVSS via the organic light emitting diode (OLED).

A second transistor T2 is connected between a data line Di and the first node N1. In addition, a gate electrode of the second transistor T2 is connected to the scan line Si. The second transistor T2 is turned on when a scan signal is supplied to the scan line Si, and electrically couples the data line Di and the first node N1.

A storage capacitor Cst is connected between the first power supply ELVDD and the first node N1. The storage capacitor Cst stores a voltage corresponding to the data signal.

The process of driving the pixels PXL1, PXL2, and PXL3 will be described. First, the scan signal is supplied to the scan line Si to turn on the second transistor T2. When the second transistor T2 is turned on, the data signal from the data line Di is supplied to the first node N1. In this case, the storage capacitor Cst stores the voltage that corresponds to the data signal. After the voltage corresponding to the data signal is stored in the storage capacitor Cst, the second transistor T2 is turned off.

Subsequently, the first transistor T1 controls, according to the voltage of the first node N1, the driving current flowing from the first power supply ELVDD to the second power supply ELVSS via the organic light emitting diode (OLED). Then, the organic light emitting diode (OLED) generates light with luminance corresponding to the amount of the driving current. When the data signal corresponding to a black grayscale is supplied to the first node N1, the first transistor T1 reduces or blocks the driving current supplied to the organic light emitting diode (OLED). In this case, the organic light emitting diode (OLED) does not emit light to display the black grayscale.

The pixel PXL1, PXL2, and PXL3 repeats the foregoing process to display an image (e.g., a predetermined image) in the display area 600. Additionally, in the present embodiment, a circuit structure of the pixel PXL1, PXL2, and PXL3 is not limited to the current embodiment illustrated in FIG. 4. For example, the pixels PXL1, PXL2, and PXL3 may include various forms of pixel circuits.

Figure 5:
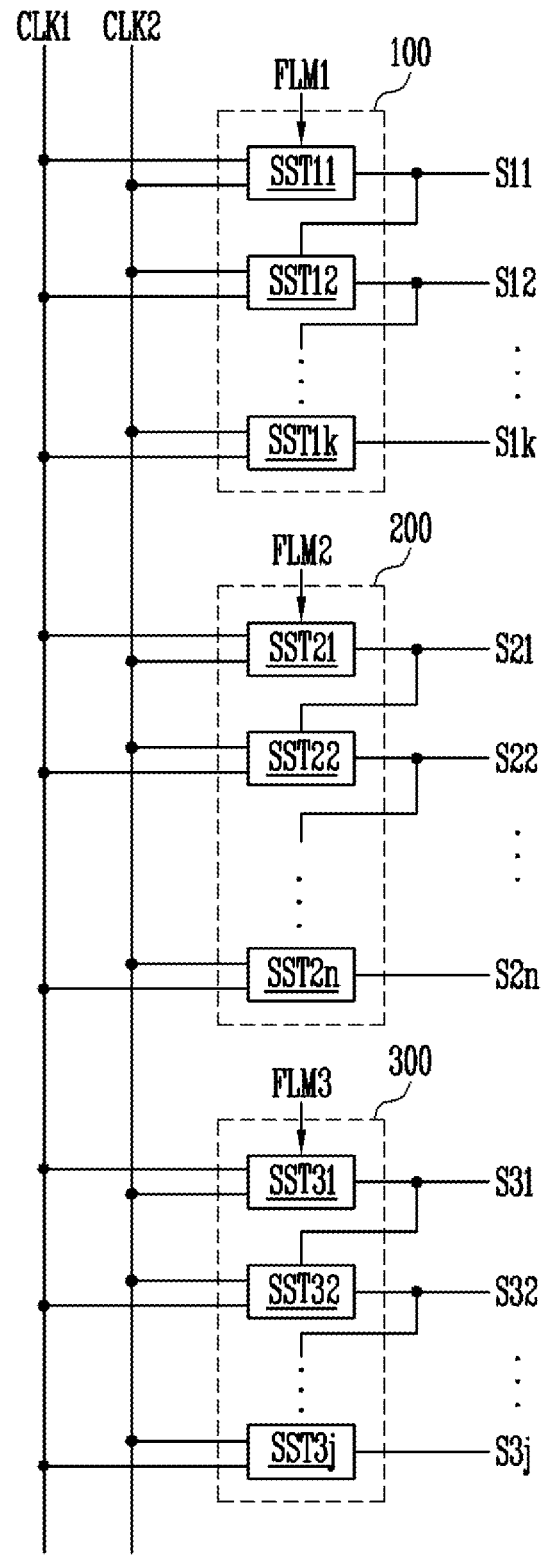
FIG. 5 shows an embodiment of scan drivers illustrated in FIG. 3.

FIG. 5 shows an embodiment of the scan drivers illustrated in FIG. 3. In FIG. 5, an embodiment in which scan drivers are driven by two clock signals is disclosed, but the present invention is not limited thereto. That is, the number and/or the kind of the clock signals may be changed.

Referring to FIG. 5, the first scan driver 100 according to the present embodiment includes first scan stages SST11 to SST1$k$ that are respectively connected to first scan lines S11 to S1$k$. In some embodiments, the number of the first scan stages SST11 to SST1$k$ may be variously modified according to the number of horizontal lines that are provided in a first pixel area 602.

The first scan stages SST11 to SST1$k$ receive a first start signal FLM1 and clock signals CLK1 and CLK2, and sequentially supply a first scan signal to the first scan lines S11 to S1$k$ according to the first start signal FLM1. For example, a first first scan stage SST11 may supply the first scan signal to a first first scan line S11 according to the first start signal FLM1. In addition, the remaining first scan stages (SST12 to SST1$k$) may provide, according to an output signal of a respective previous stage (for example, the first scan signal of the previous stage), the first scan signal to the corresponding first scan line (any of S12 to S1$k$). That is, a supply timing of the first scan signals supplied to each of the first scan lines S11 to S1$k$ may be determined according to a supply timing of the first start signal FLM1.

In some embodiments, the second scan driver 200 includes second scan stages SST21 to SST2$n$ that are respectively connected to the second scan lines S21 to S2$n$. The second scan stages SST21 to SST2$n$ receive a second start signal FLM2 and the clock signals CLK1 and CLK2, and sequentially supply a second scan signal to the second scan lines S21 to S2$n$ according to the second start signal FLM2. For example, the first second scan stage SST21 may supply the second scan signal to a first second scan line S21 according to the second start signal FLM2. In addition, the remaining second scan stages SST22 to SST2$n$ may provide, according to an output signal of the previous stage (for example, the second scan signal of the previous stage), the second scan signal to a respective one of the second scan line (any of S22 to S2$n$) connected to the second scan stages SST22 to SST2$n$. That is, a supply timing of the second scan signals supplied to each of the second scan lines S21 to S2$n$ may be determined according to a supply timing of the second start signal FLM2.

In some embodiments, the third scan driver 300 includes third scan stages SST31 to SST3$j$ that are respectively connected to the third scan lines S31 to S3$j$. In some embodiments, the number of the third scan stages SST31 to SST3$j$ may be variously modified according to the number of horizontal lines that are provided in a third pixel area 606.

The third scan stages SST31 to SST3$j$ receive a third start signal FLM3 and clock signals CLK1 and CLK2, and sequentially supply the third scan signal to a respective one of the third scan lines S31 to S3$j$ according to the third start signal FLM3. For example, a first third scan stage SST31 may supply the third scan signal to a first third scan line S31 according to the third start signal FLM3. In addition, the remaining third scan stages (SST32 to SST3$j$) may provide, according to an output signal of the previous stage (for example, the third scan signal of the previous stage), the third scan signal to a corresponding third scan line (any of S32 to S3$j$). That is, a supply timing of the third scan signals respectively supplied to the third scan lines S31 to S3$j$ may be determined according to a supply timing of the third start signal FLM3.

In the present embodiment, a configuration of the scan stages SST11 to SST1$k$, SST21 to SST2$n$, and SST31 to SST3$j$ is not specifically limited. That is, the scan stages SST11 to SST1$k$, SST21 to SST2$n$, and SST31 to SST3$j$ may be implemented with the various forms of scan driving circuits.

Figure 6:
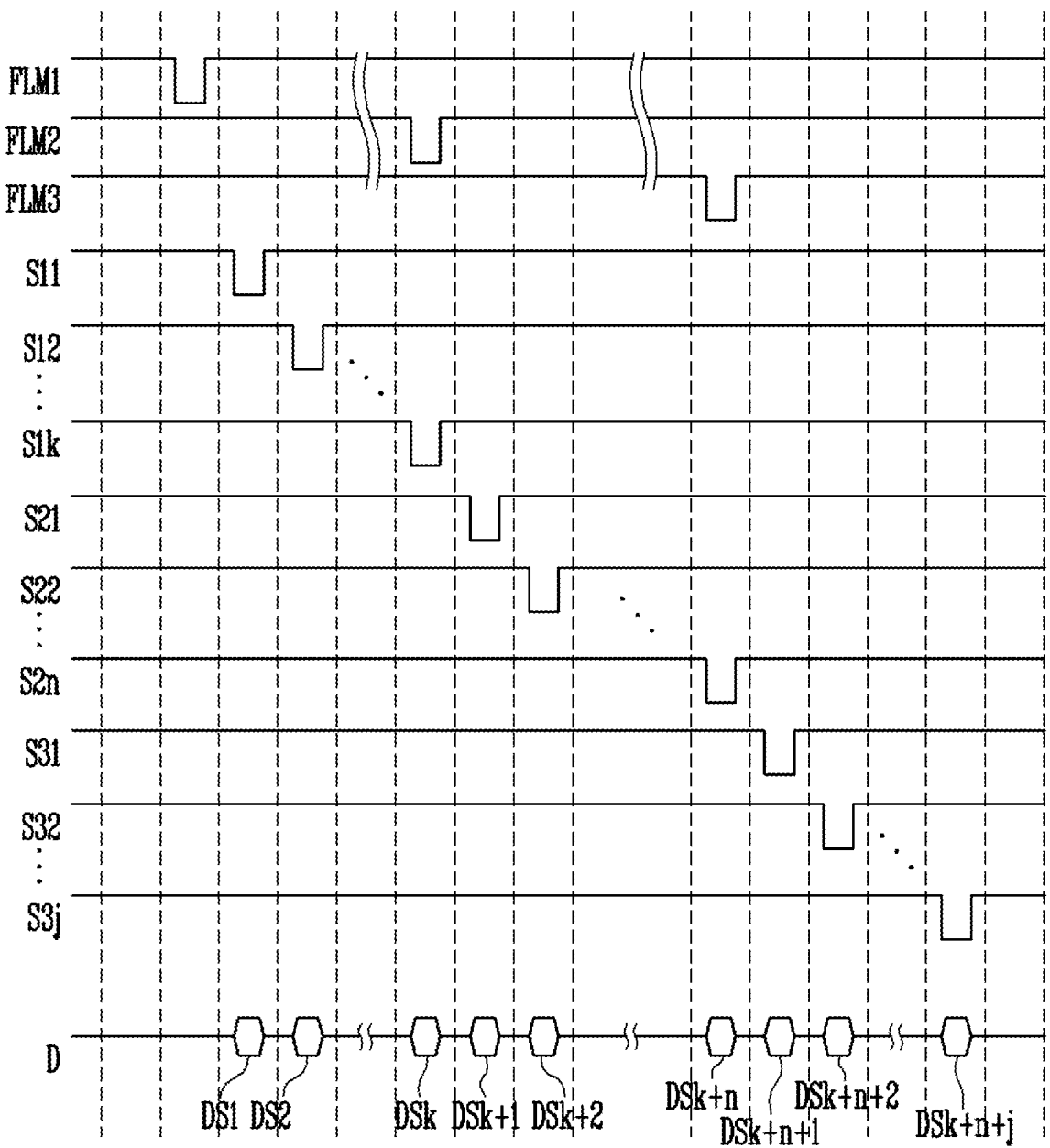
FIG. 6 shows an embodiment of driving timing of the scan drivers when the display device illustrated in FIG. 3 is driven in a first mode.
Figure 7:
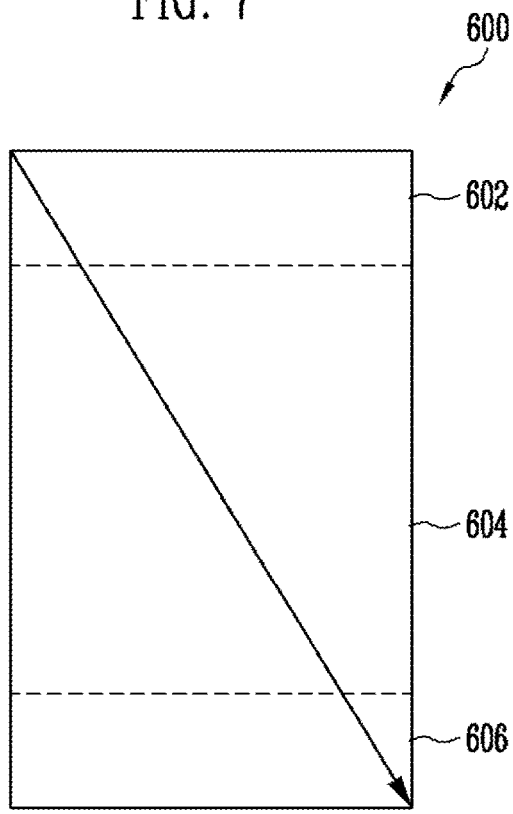
FIG. 7 schematically shows a supply sequence of scan signals supplied to a display area when the display device illustrated in FIG. 3 is driven in the first mode.
Figure 8:
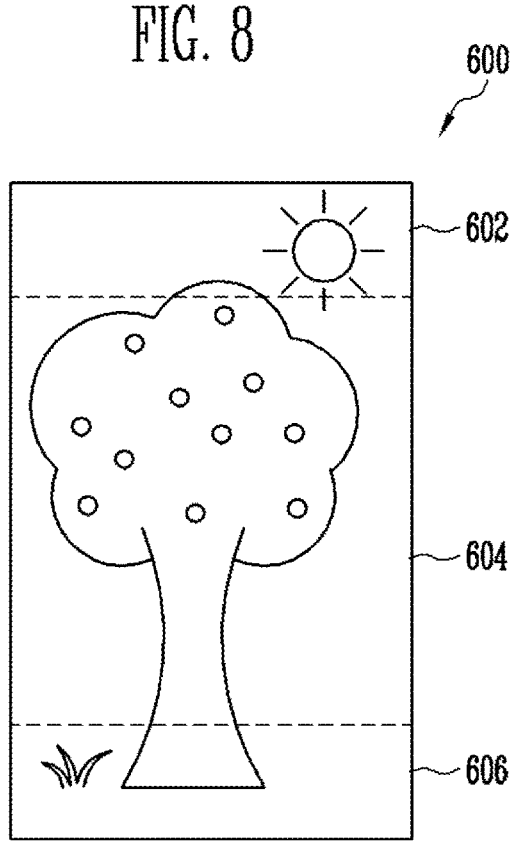
FIG. 8 shows an embodiment of an image displayed in the display area when the display device illustrated in FIG. 3 is driven in the first mode.

FIG. 6 shows an embodiment of a driving timing of the scan drivers when the display device illustrated in FIG. 3 is driven in a first mode. For example, FIG. 6 shows an embodiment of start signals inputted to scan drivers according to the first mode, and scan signals outputted from the scan drivers according to the start signals. In addition, FIG. 7 schematically shows a supply sequence of the scan signals supplied to a display area when the display device illustrated in FIG. 3 is driven in the first mode, and FIG. 8 shows an embodiment of an image displayed in the display area when the display device illustrated in FIG. 3 is driven in the first mode.

Referring to FIG. 6, when the display device is driven in the first mode, a timing controller 500 sequentially supplies a first start signal FLM1 to a first scan driver 100, a second start signal FLM2 to a second scan driver 200, and a third start signal FLM3 to a third scan driver 300. In this case, supply timings of the first start signal FLM1, the second start signal FLM2, and the third start signal FLM3 are set such that a first scan signal, a second scan signal, and a third scan signal are sequentially supplied to first scan lines S11 to S1$k$, second scan lines S21 to S2$n$, and third scan lines S31 to S3$j$. In some embodiments, the first start signal FLM1, the second start signal FLM2, and the third start signal FLM3 may have the same width, and the width may be changed.

When the first start signal FLM1 is provided, the first scan driver 100 supplies a first first scan signal to a first first scan line S11 according to clock signals CLK1 and CLK2. For example, the first scan driver 100 may shift the first start signal FLM1 according to the clock signals CLK1 and CLK2 so as to supply the first first scan signal to the first first scan line S11. In addition, the first scan driver 100 may shift the first first scan signal to supply a second first scan signal to a second first scan line S12. In the foregoing manner, the first scan driver 100 sequentially supplies the first scan signal to the first scan lines S11 to S1k. Then, data signals DS1 to DSk from a data driver 400 are supplied to a first pixel area 602. Accordingly, an image (e.g., a predetermined image) corresponding to the data signals DS1 to DSk is displayed in the first pixel area 602.

When the second start signal FLM2 is provided, the second scan driver 200 supplies a first second scan signal to a first second scan line S21 according to the clock signals CLK1 and CLK2. For example, the second scan driver 200 shifts the second start signal FLM2 according to the clock signals CLK1 and CLK2 so as to supply the first second scan signal to the first second scan line S21. In addition, the second scan driver 200 may shift the first second scan signal to supply a second second scan signal to a second second scan line S22. In the foregoing manner, the second scan driver 200 sequentially supplies the second scan signal to the second scan lines S21 to S2n. Then, data signals DSk+1 to DSk+n from the data driver 400 are supplied to a second pixel area 604, and accordingly, an image (e.g., a predetermined image) corresponding to the data signals DSk+1 to DSk+n is displayed in the second pixel area 604.

When the third start signal FLM3 is provided, the third scan driver 300 supplies a first third scan signal to a first third scan line S31 according to the clock signals CLK1 and CLK2. For example, the third scan driver 300 may shift the third start signal FLM3 according to the clock signals CLK1 and CLK2 so as to supply the first third scan signal to the first third scan line S31. In addition, the third scan driver 300 may shift the first third scan signal to supply the second third scan signal to the second third scan line S32. In the foregoing manner, the third scan driver 300 sequentially supplies the third scan signal to the third scan lines S31 to S3j. Then, data signals DSk+n+1 and DSk+n+j from the data driver 400 are supplied to the third pixel area 606, and accordingly, an image (e.g., a predetermined image) corresponding to the data signal DSk+n+1 and DSk+n+j is displayed in the third pixel area 606.

When the display device is driven in the first mode, the first, second, and third scan drivers 100, 200, and 300 repeat the foregoing process to sequentially supply the scan signal to all the scan lines S11 to S1k, S21 to S2n, and S31 to S3j of the display area 600. That is, when the display device is driven in the first mode, the first, second, and third scan drivers 100, 200, and 300 sequentially drive the first, second, and third scan lines S11 to S1k, S21 to S2n, and S31 to S3j, respectively.

Accordingly, as shown in FIG. 7, the scan signals are sequentially supplied to the first pixel area 602, the second pixel area 604, and the third pixel area 606. For example, for one frame period implementing one screen, the first pixels PXL1, the second pixels PXL2, and the third pixels PXL3 of each horizontal line may be sequentially selected in the order of the first pixel area 602, the second pixel area 604, and the third pixel area 606 so as to receive the data signal.

As described above, when the display device is driven in the first mode, a valid image may be displayed in the entire display area 600 of the display device. For example, as shown in FIG. 8, the valid image may be collectively displayed in all of the first pixel area 602, the second pixel area 604, and the third pixel area 606 forming the display area 600. For example, images displayed in the first to third pixel areas 602, 604, and 606 may be connected to realize a single connected screen.

In some embodiments, the first mode is deactivated when the display device is mounted on the wearable device 30, and otherwise, may be activated. That is, the display device may be driven in the first mode when it is separated from the wearable device 30.

Figure 9:
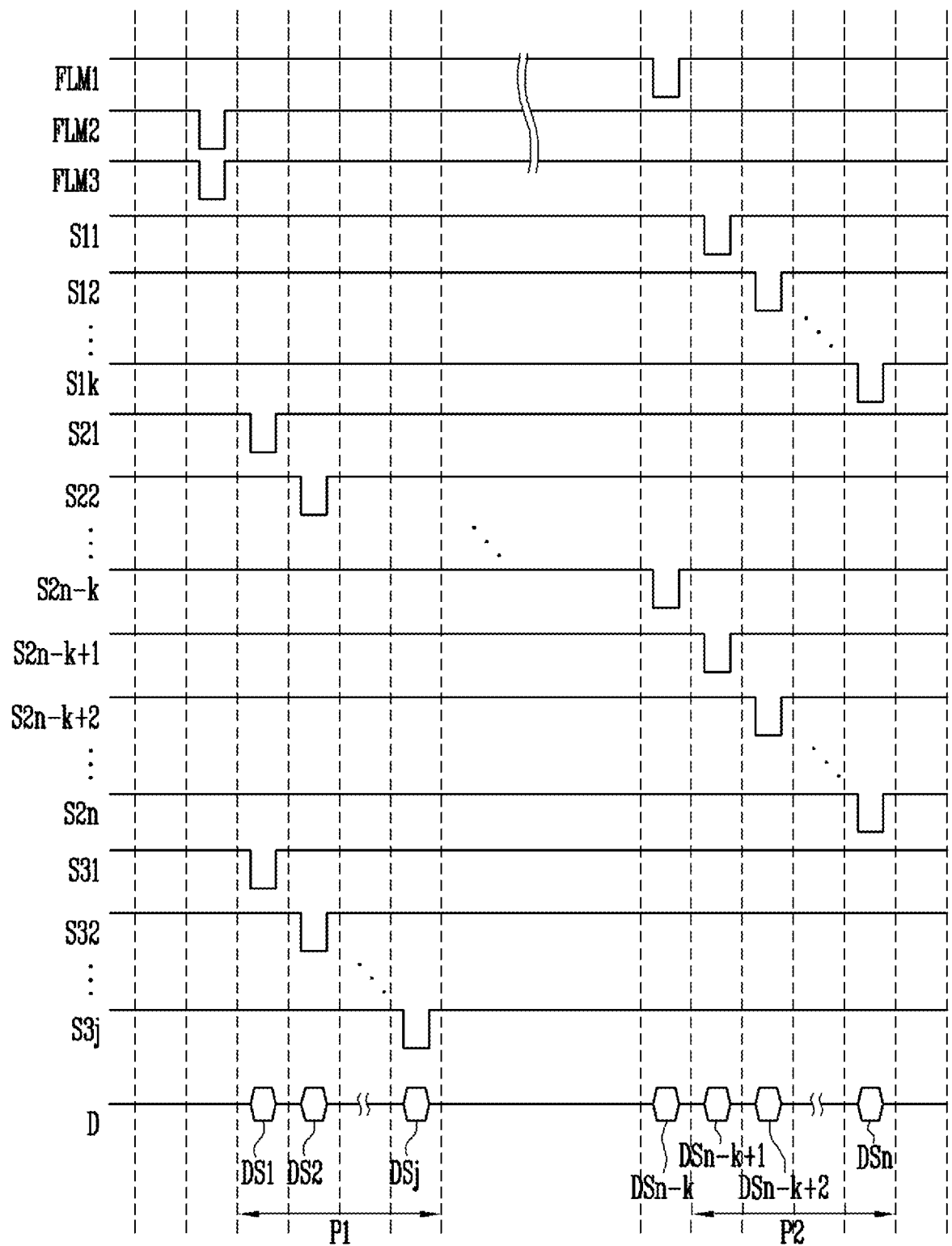
FIG. 9 shows an embodiment of driving timing of the scan drivers when the display device illustrated in FIG. 3 is driven in a second mode.
Figure 10:
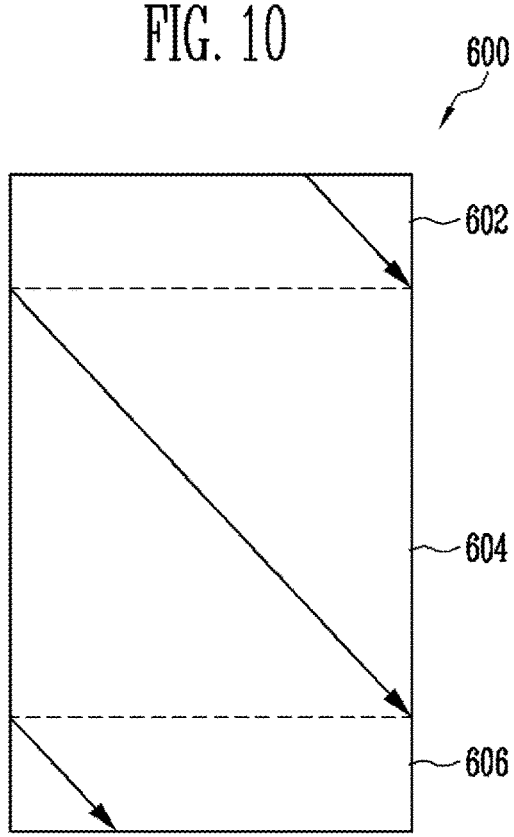
FIG. 10 schematically shows a supply sequence of the scan signals supplied to the display area when the display device illustrated in FIG. 3 is driven in the second mode.
Figure 11:
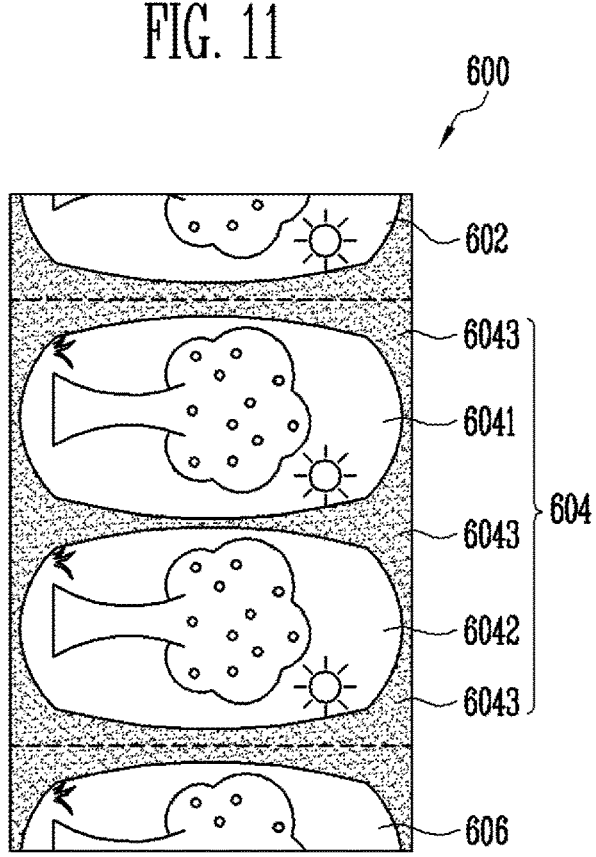
FIG. 11 shows an embodiment of an image displayed in the display area when the display device illustrated in FIG. 3 is driven in the second mode.

FIG. 9 shows an embodiment of a driving timing of the scan drivers when the display device illustrated in FIG. 3 is driven in a second mode. For example, FIG. 9 shows an embodiment of start signals inputted to the scan drivers according to the second mode, and scan signals outputted from the scan drivers according to the start signals. In addition, FIG. 10 schematically shows a supply sequence of the scan signals supplied to a display area when the display device illustrated in FIG. 3 is driven in the second mode, and FIG. 11 shows an embodiment of an image displayed in the display area when the display device illustrated in FIG. 3 is driven in the second mode.

Referring to FIG. 9, when the display device is driven in the second mode, a timing controller 500 supplies (e.g., in a predetermined order) a first start signal FLM1 to a first scan driver 100, a second start signal FLM2 to a second scan driver 200, and a third start signal FLM3 to a third scan driver 300. In this case, supply timings of the first start signal FLM1, the second start signal FLM2, and the third start signal FLM3 are set such that first scan lines S11 to S1k and third scan lines S31 to S3j are driven for some different periods during which second scan lines S21 to S2n are sequentially driven.

Particularly, in the present embodiment, when the display device is driven in the second mode, the supply timings of the first start signal FLM1, the second start signal FLM2, and the third start signal FLM3 may be set such that a dummy image, which corresponds to an image of one area adjacent to a third pixel area 606, and which may be a portion of a valid image displayed in a second pixel area 604, is displayed in a first pixel area 602, and another dummy image, which corresponds to an image of one area adjacent to the first pixel area 602, and which may be another portion of the valid image, is displayed in the third pixel area 606. For this purpose, the timing controller 500 may concurrently or simultaneously supply, according to the second mode, the second and third start signals FLM2 and FLM3 to the second and third scan drivers 200 and 300, respectively, for each frame period, and may supply the first start signal FLM1 to the first scan driver 100 after driving of the third scan lines S31 to S3j is completed.

For example, according to the second mode, for a first period P1 (e.g., an initial period) during which the second scan driver 200 sequentially drives the second scan lines S21 to S2n, the third scan driver 300 may sequentially drive the third scan lines S31 to S3j. In addition, for a second period P2 (e.g., a subsequent period following the first period P1) after driving of the third scan lines S31 to S3j is completed, the first scan driver 100 may sequentially drive the first scan lines S11 to S1k.

According to the second mode, the second scan driver 200 may drive at least some of the second scan lines that are adjacent to the first pixel area 602 (e.g., some of the second scan lines S21 to S2n) for the first period P1. Further, according to the second mode, the second scan driver 200 may drive, for the second period P2, at least some of the second scan lines that are adjacent to the third pixel area 606 (e.g., others of the second scan lines S21 to S2n). That is, when the display device is driven in the second mode, some of the second scan signals supplied to the second scan lines S21 to S2n may overlap the third scan signals supplied to the third scan lines S31 to S3j. In addition, the others of the second scan signals supplied to the second scan lines S21 to S2n may overlap the first scan signals supplied to the first scan lines S11 to S1k.

In some embodiments, a supply timing of the first start signal FLM1 may depend on the number of the first and second scan lines S11 to S1k and S21 to S2n. For example, when k first scan lines S11 to S1k are arranged in the first pixel area 602 above the second pixel area 604, the k first scan lines S11 to S1k are set to have the supply timing of the first start signal FLM1 such that they are concurrently or simultaneously driven with k second scan lines S2n−k+1 to S2n that are positioned at a lower end of the second pixel area 604. For example, when k first scan lines S11 to S1k and n (n being a natural number of k or more) second scan lines S21 to S2n are respectively arranged in the first pixel area 602 and the second pixel area 604, the supply timing of the first start signal FLM1 may be set such that the first and second scan drivers 100 and 200 concurrently or simultaneously supply, according to the second mode, the scan signal to a first first scan line S11 and an n−k+1-th second scan line S2n−k+1, respectively.

After respectively concurrently or simultaneously receiving the second and third start signal FLM2 and FLM3, the second and third scan drivers 200 and 300 output, according to the second and third start signal FLM2 and FLM3, the scan signal to a first second scan line S21 and a first third scan line S31, respectively. That is, according to the second mode, the second and third scan drivers 200 and 300 may concurrently or simultaneously supply the scan signal to the first second scan line S21 and the first third scan line S31. After driving of the third scan lines S31 to S3j is completed, the first scan driver 100 may output the scan signal to the first first scan line S11 according to the first start signal FLM1 after receiving the first start signal FLM1 from the timing controller 500. In addition, the first scan driver 100 may output the scan signal to a last first scan line S1k when the second scan driver 200 outputs the scan signal to a last second scan line S2n. That is, the first scan driver 100 and the second scan driver 200 may respectively concurrently or simultaneously supply the scan signal to the last first scan line S1k and the last second scan line S2n.

That is, in the present embodiment, according to the second mode, the second scan driver 200 sequentially drives the second scan lines S21 to S2n, and the first and third scan drivers 100 and 300 respectively drive the first scan lines S11 to S1k and the third scan lines S31 to S3j for different periods during which the second scan lines S21 to S2n are driven.

When the second start signal FLM2 is supplied for each frame period during which the second mode is executed, the second scan driver 200 sequentially supplies a second scan signal to the second scan lines S21 to S2n, and the data driver 400 outputs, according to a driving time of the second scan driver 200, data signals DS1 to DSn corresponding to a valid image to be displayed in the second pixel area 604. The data signals DS1 to DSn are supplied to the second pixel area 604 according to each second scan signal. Accordingly, the valid image corresponding to the data signals DS1 to DSn is displayed in the second pixel area 604.

In the present embodiment, when the display device is driven in the second mode, some of the data signals DS1 to DSn outputted from the data driver 400 may be concurrently or simultaneously supplied to the second and third pixel areas 604 and 606, or may be concurrently or simultaneously supplied to the first and second pixel areas 602 and 604. For example, when the display device is driven in the second mode, the same data signal DS1 may be supplied to the second and third pixels PXL2 and PXL3 that are respectively positioned in a first horizontal line of the second pixel area 604 and a first horizontal line of the third pixel area 606. In addition, the same data signal DSn may be supplied to the first and second pixels PXL1 and PXL2 that are respectively positioned in a last horizontal line of the first pixel area 602 (e.g., a k-th horizontal line) and a last horizontal line of the second pixel area 604.

When the display device is driven in the second mode, the first, second, and third scan drivers 100, 200, and 300 repeat the foregoing process and supply the scan signal to the scan lines S11 to S1k, S21 to S2n, and S31 to S3j. That is, when the display device is driven in the second mode, as shown in FIG. 10, the second scan lines S21 to S2n are sequentially driven for one frame period. In addition, the third scan lines S31 to S3j are sequentially driven for the initial first period P1 during which some of the second scan lines S21 to S2n are driven, and the first scan lines S11 to S1k are sequentially driven for the subsequent second period P2 during which others of the second scan lines S21 to S2n are driven.

In some embodiments, when the display device is driven in the second mode, a valid image is displayed only in some of the entire display area 600. For example, as shown in FIG. 11, a valid image is displayed only in the second pixel area 604 of the display area 600 according to the second mode, while a dummy image of different areas of the valid image may be displayed in the first and third pixel areas 602 and 606.

Particularly, as described above, according to the present embodiment, when the display device is driven in the second mode, for the first period P1 during which j second scan lines S21 to S2j, which are adjacent to the first pixel area 602, of the second scan lines S21 to S2n provided in the second pixel area 604 are driven, j third scan lines S31 to S3j provided in the third pixel area 606 are also driven. Accordingly, the third pixel area 606 receives the data signal that is inputted to the second pixels PXL2 connected to the first second scan line S21 to the j-th second scan line S2j, and displays the same image as is displayed by the corresponding second pixels PXL2. In addition, when the display device is driven in the second mode, for the second period P2 during which k second scan lines S2n−k+1 to S2n, which are adjacent to the third pixel area 606, of the second scan lines S21 to S2n provided in the second pixel area 604 are driven, the k first scan lines S11 to S1k provided in the first pixel area 602 are also driven. Accordingly, the first pixel area 602 receives the data signal that is inputted to the second pixels PXL2 connected to an n−k+1-th second scan line S2n−k+1 to a last n-th second scan line S2n, and displays the same image as is displayed by the corresponding second pixels PXL2.

In some embodiments, the second mode may be activated when the display device is mounted on the wearable device 30. In this case, the first and third pixel areas 602 and 606 are covered by the frame 31 of the wearable device 30, and thus become a non-visible display area NVDA, while at least some of the second pixel area 604 becomes or remains the visible display area VDA that is visible to a user.

In addition, in some embodiments, when the display device is driven in the second mode, a valid image displayed in the second pixel area 604 may be divided into a plurality of images. For example, when the display device is, as shown in FIG. 1A to FIG. 1C, mounted on the wearable device 30 including the left eye lens 21 and the right eye lens 22 to be driven, the second pixel area 604 is divided into a plurality of areas according to each of the left eye lens 21 and the right eye lens 22, and a valid image (e.g., a predetermined valid image) may be displayed in each of the divided areas.

For example, the second pixel area 604 may be divided into a plurality of areas to include a predetermined left eye area 6041 in which the left-eye image is displayed and a predetermined right eye area 6042 in which the right-eye image is displayed. In addition, in some embodiments, the second pixel area 604 may further include a border area 6043 that is positioned outside the left eye area 6041 and the right eye area 6042. For example, the border area 6043 may be positioned between the left eye area 6041 and the right eye area 6042, between the left eye area 6041 and the first pixel area 602, and between the right eye area 6042 and the third pixel area 606. In some embodiments, the border area 6043 may not be recognized by the user because it is hidden by the frame 31 of the wearable device 30 or the like.

In some embodiments, when the display device is driven in the second mode, the border area 6043 may display a black grayscale. Alternatively, in another embodiment, the border area 6043 may also display a grayscale that gradually changes in a gradation form.

When the display device is driven in the second mode, the data driver 400 may supply the data signal corresponding to the left-eye image according to the left eye area 6041, and may supply the data signal corresponding to the right-eye image according to the right eye area 6042. In addition, when the left eye area 6041 is positioned relatively close to the first pixel area 602, and the right eye area 6042 is positioned relatively close to the third pixel area 606, at least some of the data signal corresponding to the left-eye image may be supplied to the third pixel area 606, and at least some of the data signal corresponding to the right-eye image may be supplied to the first pixel area 602.

In addition, when the display device is driven in the second mode, the data driver 400 may supply the data signal corresponding to a black grayscale to the border area 6043. That is, of the second pixel area 604, the data signal corresponding to the black grayscale may be supplied to the border area 6043 between the left eye area 6041 and the right eye area 6042, and to the border area 6043 outside the left eye area 6041 and the right eye area 6042. Accordingly, the data signal corresponding to the black grayscale may be supplied in the border area between the pixel areas 602, 604, and 606, as well as in the border areas 6043 included in the second pixel area 604. Alternatively, in another embodiment, the data signal corresponding to the grayscale that gradually changes in a gradation form may also be supplied to each of the border areas 6043.

Additionally, in yet another embodiment of the present invention, the left eye area 6041 and the right eye area 6042 are not separated, and the second pixel area 604 may be integrated into one visible display area VDA. In this case, the border area 6043 may be positioned in the border area 6043 between the respective pixel areas 602, 604, and 606 (e.g., the border between the first pixel area 602 and the second pixel area 604, and the border between the second pixel area 604 and the third pixel area 606).

According to the present embodiment described above, when the display device is driven in the second mode, the data signal corresponding to the black grayscale (or grayscale that gradually changes in a gradation form) is supplied to at least the border area between the pixel areas 602, 604, and 606 (e.g., border lines respectively between the pixel areas 602, 604, and 606, and edges of each of the pixel areas 602, 604, and 606). In this case, the same data signal as that of the last horizontal line of the second pixel area 604, (e.g., the data signal of the black grayscale) may be supplied to the last horizontal line of the first pixel area 602. In addition, the same data signal as that of the first horizontal line of the second pixel area 604 (e.g., the data signal of the black grayscale) may also be supplied to the first horizontal line of the third pixel area 606.

Therefore, according to the present embodiment, sharp image change does not occur in the border area between the pixel areas 602, 604, and 606, and it is possible to reduce or prevent an image sticking from being generated at the interface (e.g., to reduce or prevent the occurrence of an image-sticking phenomenon). In addition, because the black grayscale is displayed at the edges of the first and third pixel areas 602 and 606 that are adjacent to the second pixel area 604, light leakage interference caused by the first and third pixel areas 602 and 606 may be reduced or prevented.

In addition, according to the present embodiment, while the display device is driven in the second mode, the scan signal is supplied not only to the second scan lines S21 to S2n of the second pixel area 604 that is set to the visible display area VDA, but also to the scan lines S11 to S1k and S31 to S3j of the first and third pixel areas 602 and 606 that are set to the non-visible display area NVDA, thereby driving all of the first to third pixels PXL1, PXL2, and PXL3. According to the present embodiment, in the visible display area VDA and the non-visible display area NVDA, characteristics of driving transistors (e.g., first transistor T1 in FIG. 4) provided in the first to third pixels PXL1, PXL2, and PXL3 can be reduced or prevented from being differently set, and accordingly, display quality of the display device can be improved.

In addition, according to the present embodiment, when the display device is driven in the second mode, the first and third scan lines S11 to S1k and S31 to S3j are driven for at least some period of the periods during which the second scan lines S21 to S2n are driven. Accordingly, the time required for driving of the display area 600 may be sufficiently secured.

Figure 12:
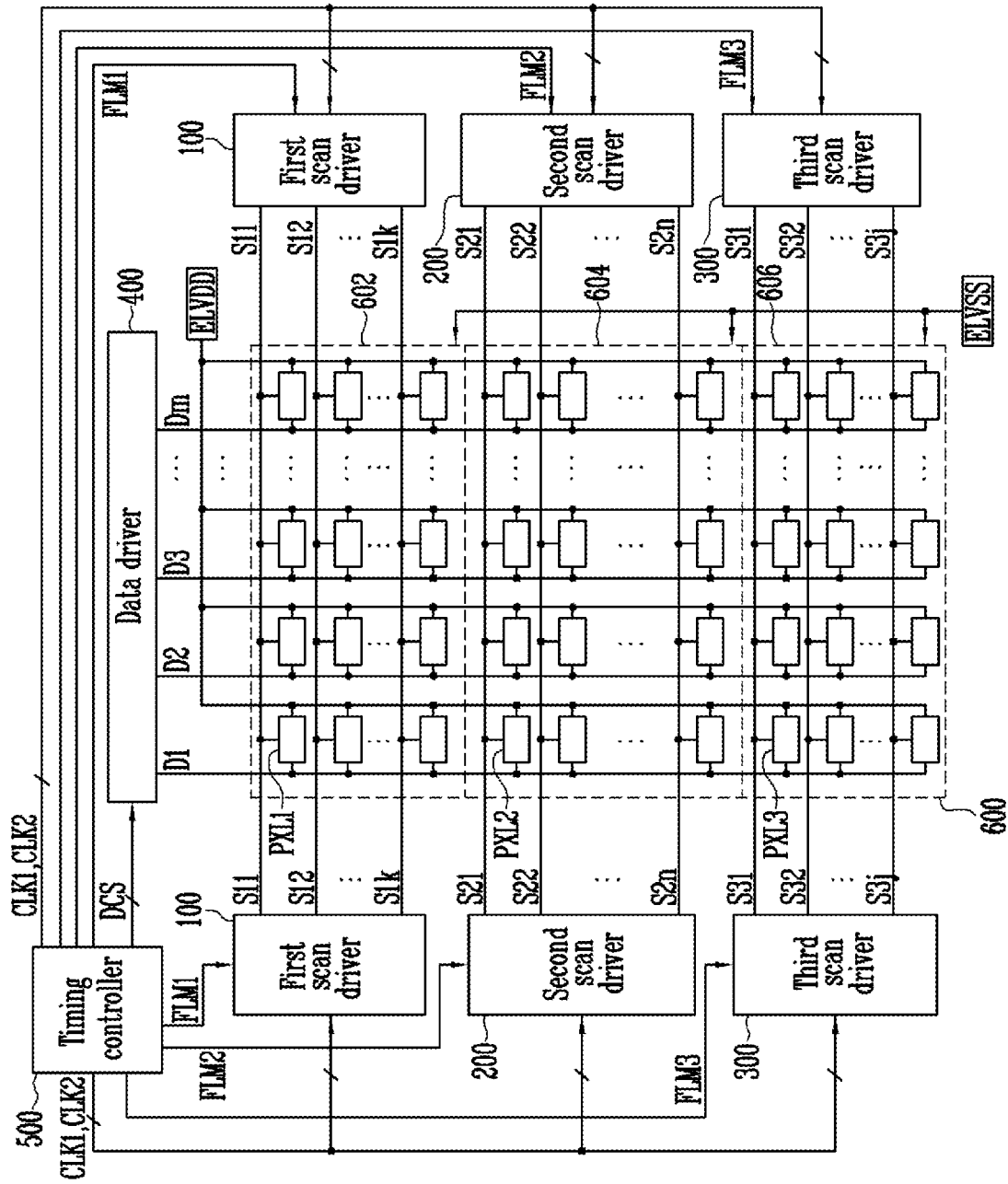
FIG. 12 shows a display device according to an embodiment of the present invention.

FIG. 12 shows a display device according to an embodiment of the present invention. In FIG. 12, the same or similar components as those of FIG. 3 are denoted by the same reference numerals, and a repeated detailed description thereof will be omitted.

Referring to FIG. 12, in the display device according to the present embodiment, scan drivers 100, 200, and 300 may be provided at opposite sides of the display area 600. For example, the display device according to the present embodiment may include two first scan drivers 100, two second scan drivers 200, and two third scan drivers 300, one of each being at each side of the display area 600. In some embodiments, any one of the first scan drivers 100, any one of the second scan drivers 200, and any one of the third scan drivers 300 are located at one side of the display area 600, while the other of the first scan drivers 100, the other of the second scan drivers 200, and the other of the third scan drivers 300 may be located at the other side of the display area 600. According to the present embodiment, each of the scan lines S11 to S1k, S21 to S2n, and S31 to S3j may receive a scan signal from their opposite ends.

Figure 13:
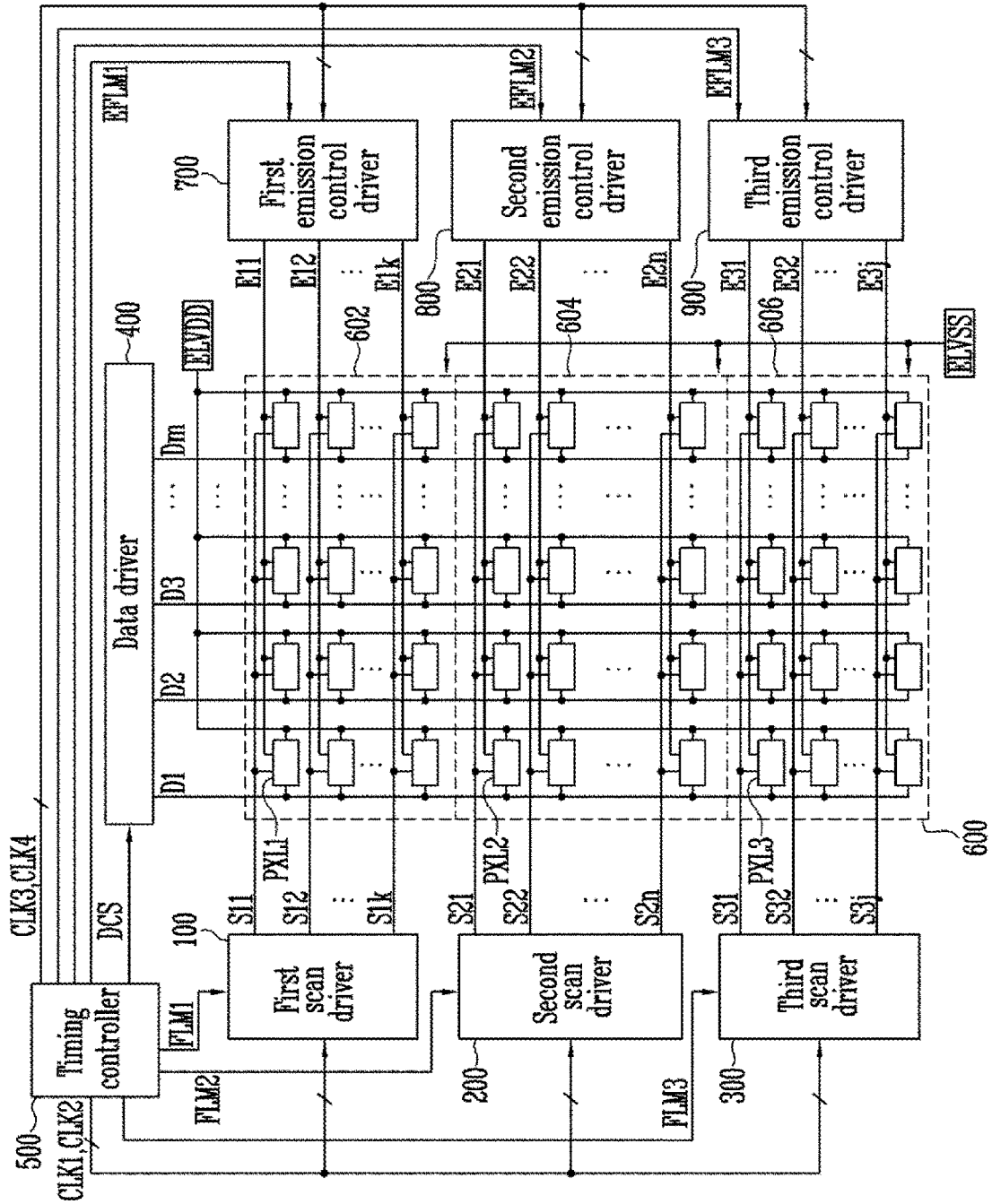
FIG. 13 shows a display device according to an embodiment of the present invention.

FIG. 13 shows a display device according to an embodiment of the present invention. In FIG. 13, the same or similar components as in FIG. 3 are denoted by the same reference numerals, and a repeated detailed description thereof will be omitted.

Referring to FIG. 13, the display device according to the present embodiment further includes first emission control lines E11 to E1k, second emission control lines E21 to E2n, third emission control lines E31 to E3j, a first emission control driver 700, a second emission control driver 800, and a third emission control driver 900. In the current embodiment of FIG. 13, one first emission control driver 700, one second emission control driver 800, and one third emission control driver 900 are respectively shown, but the present invention is not limited thereto. For example, at least one of the first emission control driver 700, the second emission control driver 800, and the third emission control driver 900 may be provided in plural numbers, and may be located at different respective sides of the display area 600.

In some embodiments, the first emission control lines E11 to E1k are provided in a first pixel area 602 such that they are connected to first pixels PXL1, while the second emission control lines E21 to E2n may be provided in a second pixel area 604 such that they are connected to second pixels PXL2. In addition, the third emission control lines E31 to E3j may be in a third pixel area 606 such that they are connected to third pixels PXL3.

In some embodiments, the first emission control driver 700 may be connected to the first emission control lines E11 to E1k such that an emission control signal is sequentially supplied to the first emission control lines E11 to E1k. The second emission control driver 800 may be connected to the second emission control lines E21 to E2n such that the emission control signal is sequentially supplied to the second emission control lines E21 to E2n. The third emission control driver 900 may be connected to the third emission control lines E31 to E3j such that the emission control signal is sequentially supplied to the third emission control lines E31 to E3j. In some embodiments, the emission control signal outputted from the first to third emission control drivers 700, 800, and 900 may be set to a gate-off voltage that can turn off the transistors included in the first to third pixels PXL1, PXL2, and PXL3.

In some embodiments, the numbers of the first scan lines S11 to S1k, the first emission control lines E11 to E1k, the third scan lines S31 to S3j, and/or the third emission control lines E31 to E3j may be variously set to at least two or more in consideration of the area overlapping the frame 31.

Additionally, in the present embodiment, the first, second, and third pixels PXL1, PXL2, and PXL3 may include various forms of pixel circuits. For example, the first, second, and third pixels PXL1, PXL2, and PXL3 shown in FIG. 13 may include various forms of pixel circuits, the light emitting time of which is controlled according to the emission control signal.

In the display device according to the foregoing embodiment, the timing controller 500 may further generate, based on externally supplied timing signals, a first emission start signal EFLM1, a second emission start signal EFLM2, a third emission start signal EFLM3, and clock signals (e.g., predetermined clock signals) CLK3 and CLK4. The clock signals CLK3 and CLK4 generated from the timing controller 500 may be supplied to the first emission control driver 700, the second emission control driver 800, and the third emission control driver 900. In addition, the first emission start signal EFLM1 may be supplied to the first emission control driver 700, the second emission start signal EFLM2 may be supplied to the second emission control driver 800, and the third emission start signal EFLM3 may be supplied to the third emission control driver 900.

The first emission start signal EFLM1 controls a supply timing of the first emission control signals. The clock signals CLK3 and CLK4 supplied to the first emission control driver 700 are used to shift the first emission start signal EFLM1.

The second emission start signal EFLM2 controls a supply timing of the second emission control signals. The clock signals CLK3 and CLK4 supplied to the second emission control driver 800 are used to shift the second emission start signal EFLM2.

The third emission start signal EFLM3 controls a supply timing of the third emission control signals. The clock signals CLK3 and CLK4 supplied to the third emission control driver 900 are used to shift the third emission start signal EFLM3.

The display device according to the present embodiment may control, according to the emission control signals outputted from the emission control drivers 700, 800, and 900, emission periods of the pixels PXL1, PXL2, and PXL3. For example, the display device according to present embodiment may control, according to the first mode and the second mode described above, and in different ways, the light emission of the pixels PXL1, PXL2, and PXL3.

Figure 14:
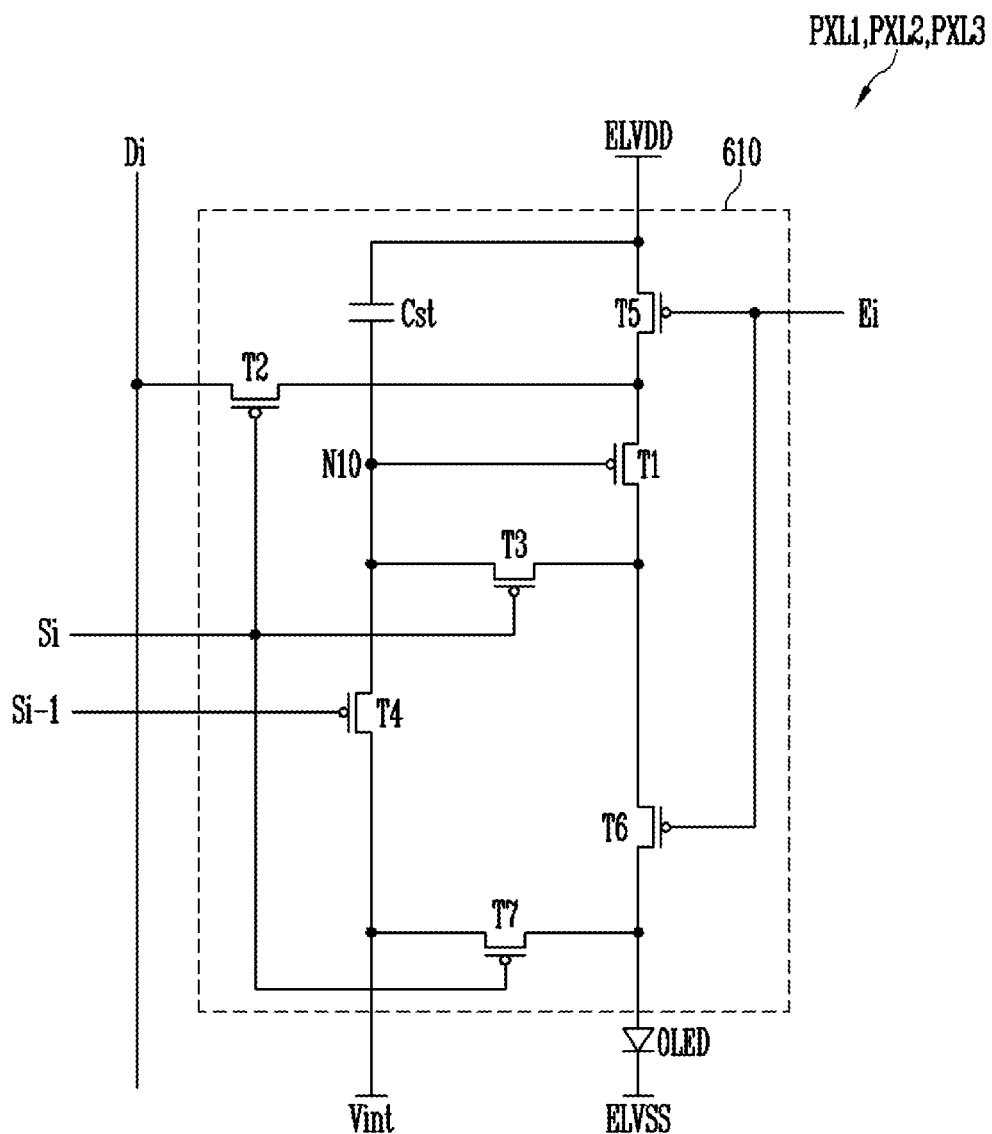
FIG. 14 shows an embodiment of a pixel illustrated in FIG. 13.

FIG. 14 shows an embodiment of one of the pixels illustrated in FIG. 13. In FIG. 14, for ease of description, pixel PXL1, PXL2, and PXL3 connected to an i-th data line Di and an i-th scan line Si (e.g., any one of first scan lines S11 to S1k, second scan lines S21 to S2n, and third scan lines S31 to S3j) will be shown.

Referring to FIG. 14, the pixels PXL1, PXL2, and PXL3 according to the present embodiment include an organic light emitting diode (OLED), and a pixel circuit 610 for controlling an amount of a driving current supplied to the organic light emitting diode (OLED).

An anode of the organic light emitting diode (OLED) is connected to the pixel circuit 610, while a cathode thereof is connected to a second power supply ELVSS. The organic light emitting diode (OLED) emits light with luminance corresponding to the amount of the driving current that is supplied from the pixel circuit 610.

The pixel circuit 610 controls, according to a data signal, an amount of current flowing from a first power supply ELVDD to the second power supply ELVSS via the organic light emitting diode (OLED). For this purpose, the pixel circuit 610 includes a first transistor T1, a second transistor T2, a third transistor T3, a fourth transistor T4, a fifth transistor T5, a sixth transistor T6, a seventh transistor T7, and a storage capacitor Cst.

The seventh transistor T7 is connected between an initialization power supply Vint and the anode of the organic light emitting diode (OLED). In addition, a gate electrode of the seventh transistor T7 is connected to an i-th scan line Si. The seventh transistor T7 is turned on when a scan signal is supplied to the i-th scan line. Si, and supplies a voltage of the initialization power supply Vint to the anode of the organic light emitting diode (OLED). In this case, the initialization power supply Vint may be set to be equal to or less than a lowest voltage of the data signal.

The sixth transistor T6 is connected between the first transistor T1 and the organic light emitting diode (OLED). In addition, a gate electrode of the sixth transistor T6 is connected to an emission control line Ei. The sixth transistor T6 is turned off when an emission control signal is supplied to the emission control line Ei, and is otherwise turned on.

The fifth transistor T5 is connected between the first power supply ELVDD and the first transistor T1. In addition, a gate electrode of the fifth transistor T5 is connected to the emission control line Ei. The fifth transistor T5 is turned off when the emission control signal is supplied to the emission control line Ei, and is otherwise turned on.

A first electrode of the first transistor T1 (driving transistor) is connected to the first power supply ELVDD through the fifth transistor T5, and the second electrode of the first transistor T1 is connected to the anode of the organic light emitting diode (OLED) through the sixth transistor T6. In addition, a gate electrode of the first transistor T1 is connected to a tenth node N10. The first transistor T1 controls, according to a voltage of the tenth node N10, the driving current flowing from the first power supply ELVDD to the second power supply ELVSS via the organic light emitting diode (OLED).

The third transistor T3 is connected between a second electrode of the first transistor T1 and the tenth node N10. In addition, a gate electrode of the third transistor T3 is connected to the i-th scan line Si. The third transistor T3 is turned on when the scan signal is supplied to the i-th scan line Si, and electrically couples the second electrode of the first transistor T1 and the tenth node N10. Accordingly, when the third transistor T3 is turned on, the first transistor T1 is diode-connected.

The fourth transistor T4 is connected between the tenth node N10 and the initialization power supply Vint. In addition, a gate electrode of the fourth transistor T4 is connected to an i−1-th scan line Si−1. The fourth transistor T4 is turned on when the scan signal is supplied to the i−1-th scan line Si−1, and supplies the voltage of the initialization power supply Vint to the tenth node N10.

The second transistor T2 is connected between a data line Di and a first electrode of the first transistor T1. In addition, a gate electrode of the second transistor T2 is connected to the i-th scan line Si. The second transistor T2 is turned on when the scan signal is supplied to the i-th scan line Si, and electrically couples the data line Dm and the first electrode of the first transistor T1.

The storage capacitor Cst is connected between the first power supply ELVDD and the tenth node N10. The storage capacitor Cst stores a voltage corresponding to the data signal and a threshold voltage of the first transistor T1.

Figure 15:
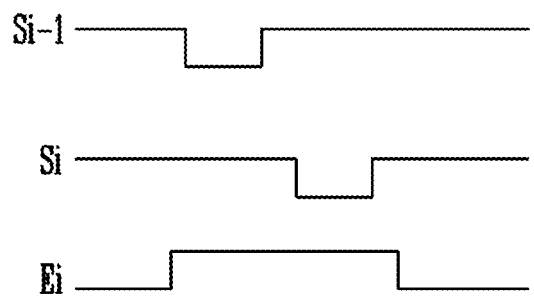
FIG. 15 shows an embodiment of a driving method of the pixel illustrated in FIG. 14.

FIG. 15 shows an embodiment of a driving method of the pixel illustrated in FIG. 14.

Referring to FIG. 15, an emission control signal of a gate-off voltage is first provided to an emission control line Ei. When the emission control signal is supplied to the emission control line Ei, a fifth transistor T5 and a sixth transistor T6 are turned off. Accordingly, pixels PXL1, PXL2, and PXL3 are set to a non-emitting state.

Subsequently, a scan signal is supplied to an i−1-th scan line Si−1 such that a fourth transistor T4 is turned on. When the fourth transistor T4 is turned on, a voltage of the initialization power supply Vint is provided to a tenth node N10. Then, a tenth node N10 is initialized to a voltage of the initialization power supply Vint.

After the tenth node N10 is initialized to the voltage of the initialization power supply Vint, the scan signal is supplied to an i-th scan line Si. When the scan signal is supplied to the i-th scan line Si, a second transistor T2, a third transistor T3, and a seventh transistor T7 are turned on.

When the seventh transistor T7 is turned on, the voltage of the initialization power supply Vint is supplied to an anode of an organic light emitting diode (OLED). Then, a parasitic capacitor formed in the organic light emitting diode (OLED) is discharged, thereby improving capability of expressing a black grayscale.

For example, the parasitic capacitor of the organic light emitting diode (OLED) is charged with a certain voltage according to a current that is supplied from the previous frame. When implementing a black grayscale in the current frame, the organic light emitting diode (OLED) should maintain a non-emitting state. However, when the parasitic capacitor of the organic light emitting diode (OLED) maintains the charged state, a leakage current of the first transistor T1 may cause the organic light emitting diode (OLED) to minutely emit light.

On the contrary, when the parasitic capacitor of the organic light emitting diode (OLED) is discharged, the leakage current of the first transistor T1 first charges the parasitic capacitor of the organic light emitting diode (OLED). Accordingly, the organic light emitting diode (OLED) maintains the non-emitting state.

When the third transistor T3 is turned on, a first transistor T1 is diode-connected.

When the second transistor T2 is turned on, the data signal from the data line Di is supplied to a first electrode of the first transistor T1. In this case, because the tenth node N10 is initialized to the voltage of the initialization power supply Vint, the first transistor T1 is turned on. When the first transistor T1 is turned on, a voltage obtained by subtracting a threshold voltage of the first transistor T1 from the data signal is applied to the tenth node N10. The data signal applied to the tenth node N10 and the voltage corresponding to the threshold voltage of the first transistor T1 are stored in a storage capacitor Cst.

After the voltage corresponding to the data signal and the threshold voltage of the first transistor T1 are stored in the storage capacitor Cst, supply of the emission control signal to the emission control line Ei is stopped. Accordingly, when the supply of the emission control signal to emission control line Ei is stopped, a gate-on voltage may be applied to the emission control line Ei.

When the supply of the emission control signal to the emission control line Ei is stopped, the fifth transistor T5 and the sixth transistor T6 are turned on. Then, a current path is formed from the first power supply ELVDD to the second power supply ELVSS via the fifth transistor T5, the first transistor T1, the sixth transistor T6, and the organic light emitting diode (OLED). In this case, the first transistor T1 controls, according to a voltage of the tenth node N10, an amount of the driving current flowing from the first power supply ELVDD to the second power supply ELVSS via the organic light emitting diode (OLED). Then, the organic light emitting diode (OLED) emits light with luminance corresponding to the amount of the driving current that is supplied from the first transistor T1.

The pixel PXL1, PXL2, and PXL3 repeatedly performs the foregoing process to generate light with luminance corresponding to the data signal. Additionally, in the present embodiment, a circuit structure of the pixel PXL1, PXL2, and PXL3 is not limited to that of FIG. 14. For example, the pixel PXL1, PXL2, and PXL3 may be implemented to have the various forms.

The emission control signal supplied to the emission control line Ei is supplied to overlap at least one scan signal such that the pixel PXL1, PXL2, and PXL3 is set to a non-emitting state for the period in which the data signal is charged to the pixel PXL1, PXL2, and PXL3. As an example, the emission control signal may overlap the scan signal supplied to at least the current scan line (e.g., the i-th scan line Si), and may also overlap the scan signal supplied to the previous scan line (e.g., the i−1-th scan line Si−1). A supply timing of the emission control signal may be set to various ways.

Figure 16:
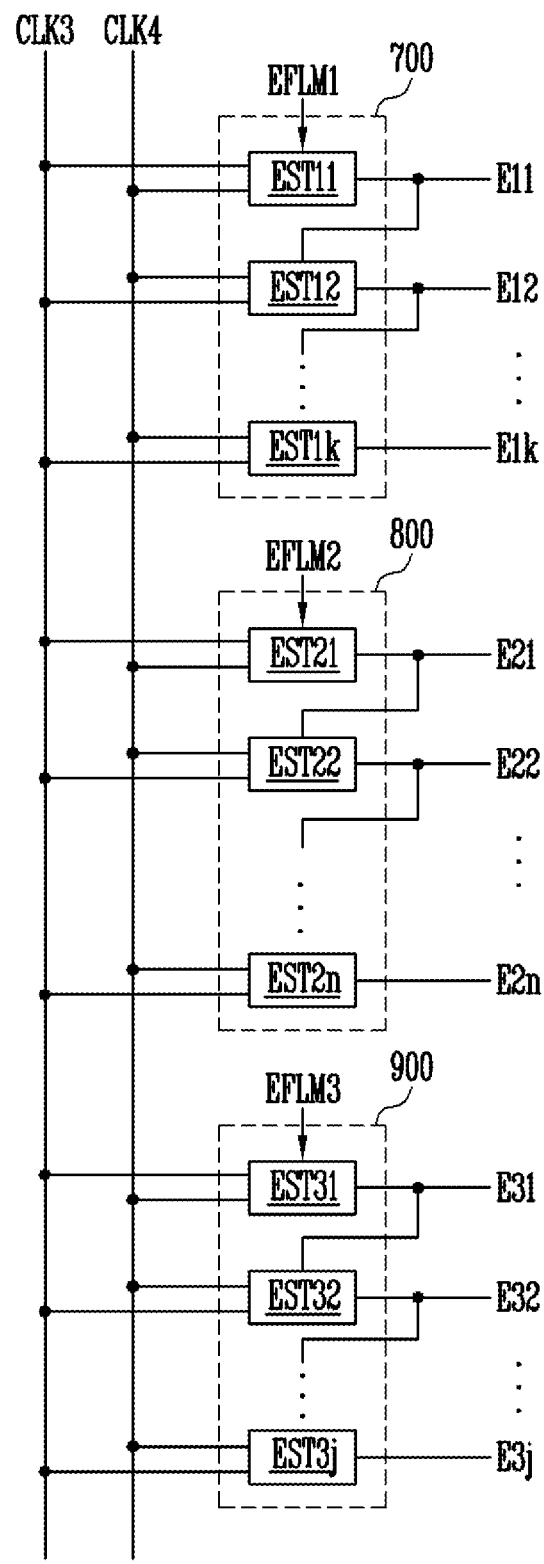
FIG. 16 shows an embodiment of emission control drivers shown in FIG. 13.

FIG. 16 shows an embodiment of emission control drivers shown in FIG. 13. In FIG. 16, an embodiment in which the emission control drivers are driven by two clock signals is disclosed, but the present invention is not limited thereto. That is, the number and/or the kind of clock signals that are inputted to the emission control drivers may be changed.

Referring to FIG. 16, a first emission control driver 700 according to the present embodiment includes first emission control stages EST11 to EST1k that are respectively connected to first emission control lines E11 to E1k, and a second emission control driver 800 includes second emission control stages EST21 to EST2n that are respectively connected to second emission control lines E21 to E2n. In addition, a third emission control driver 900 includes third emission control stages EST31 to EST3j that are respectively connected to third emission control lines E31 to E3j.

The first emission control stages EST11 to EST1k receive a first emission start signal EFLM1 and clock signals CLK3 and CLK4, and supply a first emission control signal to each of the first emission control lines E11 to E1k according to the first emission start signal EFLM1.

A first first emission control stage EST11 supplies the first emission control signal to a first first emission control line E11 according to the first emission start signal EFLM1. The remaining first emission control stages EST12 to EST1k supply, according to an output signal of a respective previous stage (e.g., a first emission control signal outputted from the previous stage), the first emission control signal to the first emission control line (any one of E12 to E1k) that is connected to the respective emission control stage EST12 to EST1k.

In this case, a width of the first emission control signal is determined according to a width of the first emission start signal EFLM1. For example, the wider the first emission start signal EFLM1 becomes, the wider the first emission control signal becomes. Accordingly, the width of the first emission control signal may be controlled by controlling the width of the first emission start signal EFLM1. An emission time of the first pixels PXL1 may be controlled by controlling the width of the first emission control signal.

In some embodiments, the width of the first emission start signal EFLM1 may be determined by a structure of the first pixels PXL1 and by a first scan signal supplied to the first scan lines S11 to S1k. For example, the first emission start signal EFLM1 may be set to have the width such that the first emission control signal supplied to a first first emission control line E11 overlaps a first scan signal supplied to the first first scan line S11.

The second emission control stages EST21 to EST2n receive a second emission start signal EFLM2 and the clock signals CLK3 and CLK4, and supply a second emission control signal to each of the second emission control lines E21 to E2n according to the second emission start signal EFLM2.

The first second emission control stage EST21 supplies the second emission control signal to the first second emission control line E21 according to the second emission start signal EFLM2. The remaining second emission control stages EST22 to EST2n provide, according to an output signal of a respective previous stage (e.g., the second emission control signal outputted from the previous stage), the second emission control signal to the corresponding connected second emission control line (any one of E22 to E2n).

In this case, a width of the second emission control signal is determined according to a width of the second emission start signal EFLM2. For example, the wider the width of the second emission start signal EFLM2 becomes, the wider the width of the second emission control signal becomes. Accordingly, the width of the second emission control signal may be controlled by controlling the width of the second emission start signal EFLM2. An emission time of the second pixels PXL2 may be controlled by controlling the width of the second emission control signal.

In some embodiments, the width of the second emission start signal EFLM2 may be determined by a structure of the second pixels PXL2 and by the second scan signal supplied to the second scan lines S21 to S2n. For example, the second emission start signal EFLM2 may be set to have the width such that the second emission control signal supplied to a first second emission control line E21 overlaps the second scan signal supplied to a first second scan line S21.

The third emission control stages EST31 to EST3j receive a third emission start signal EFLM3 and the clock signals CLK3 and CLK4, and supply a third emission control signal to each of the third emission control lines E31 to E3j according to the third emission start signal EFLM3.

The first third emission control stage EST31 supplies the third emission control signal to a first third emission control line E31 according to the third emission start signal EFLM3. The remaining third emission control stages EST32 to EST3j provide, according to an output signal of a respective previous stage (e.g., the third emission control signal outputted from the previous stage), the third emission control signal to the respective connected third emission control line (any one of E32 to E3j).

In this case, a width of the third emission control signal is determined according to a width of the third emission start signal EFLM3. For example, the wider the width of the third emission start signal EFLM3 becomes, the wider the width of the third emission control signal becomes. Accordingly, the width of the third emission control signal may be controlled by controlling the width of the third emission start signal EFLM3. An emission time of the third pixels PXL3 may be controlled by controlling the width of the third emission control signal.

In some embodiments, the width of the third emission start signal EFLM3 may be determined by a structure of the third pixels PXL3 and by the third scan signal supplied to the third scan lines S31 to S3j. For example, the third emission start signal EFLM3 may be set to have a width such that the third emission control signal supplied to the first third emission control line E31 overlaps the third scan signal supplied to the first third scan line S31.

In the present embodiment, a configuration of the emission control stages EST11 to EST1k, EST21 to EST2n, and EST31 to EST3j is not specifically limited thereto. That is, the emission control stages EST11 to EST1k, EST21 to EST2n, and EST31 to EST3j control, according to the widths of the emission start signals EFLM1, EFLM2, and EFLM3, the width of the emission control signal supplied to the emission control lines E11 to E1k, E21 to E2n, and E31 to E3j, and may be implemented by various forms of emission control circuits that are currently disclosed.

Figure 17:
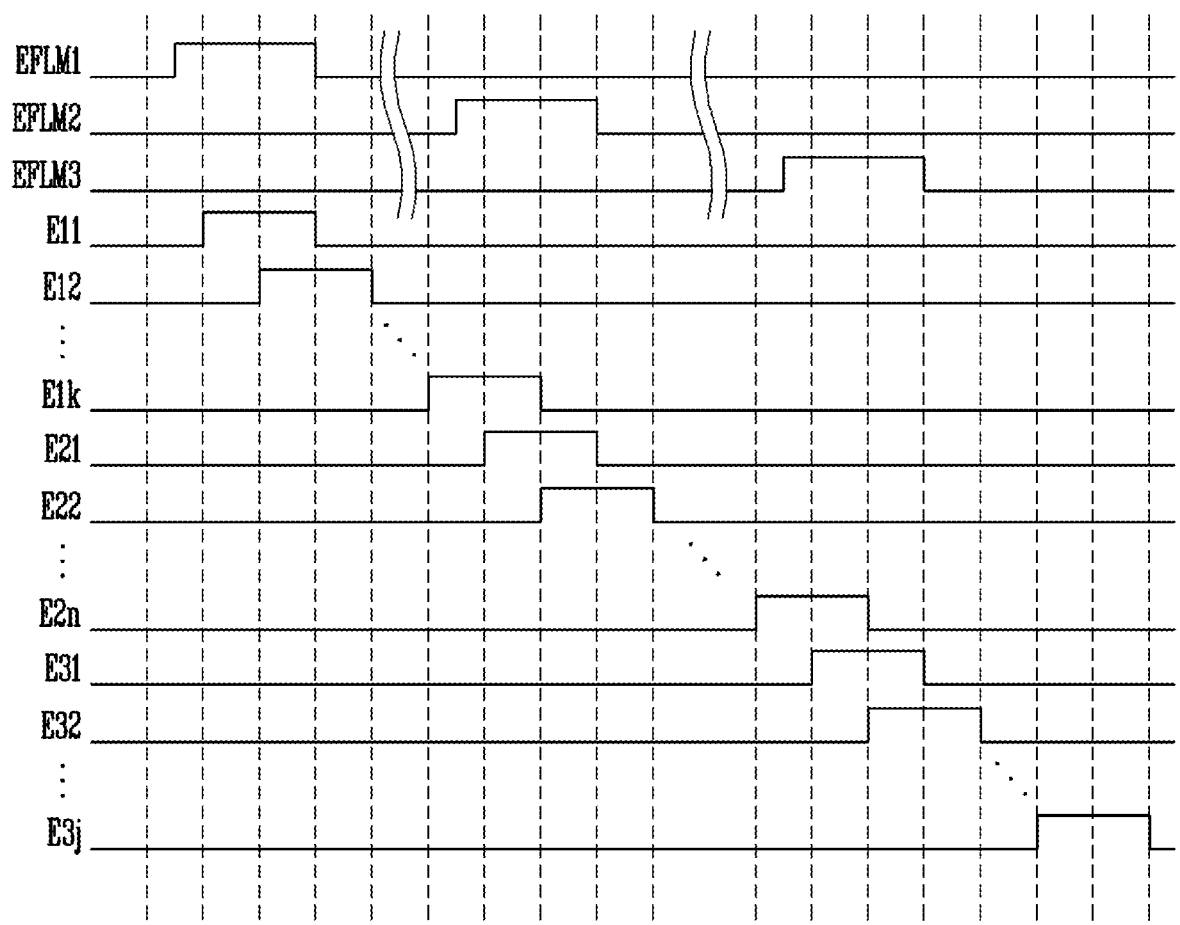
FIG. 17 shows an embodiment of driving timing of the emission control drivers when the display device shown in FIG. 13 is driven in a first mode.

FIG. 17 shows an embodiment of a driving timing of emission control drivers when the display device shown in FIG. 13 is driven in the first mode. In this case, the scan signals as shown in FIG. 6 may be supplied to scan lines.

Referring to FIG. 17, when the display device is driven in the first mode, a timing controller 500 sequentially supplies a first emission start signal EFLM1, a second emission start signal EFLM2, and a third emission start signal EFLM3 to a first emission control driver 700, a second emission control driver 800, and a third emission control driver 900, respectively. In this case, the first emission start signal EFLM1, the second emission start signal EFLM2, and the third emission start signal EFLM3 are set to have supply timings such that the first emission control signal, the second emission control signal, and the third emission control signal are sequentially supplied to first emission control lines E11 to E1$k$, second emission control lines E21 to E2$n$, and third emission control lines E31 to E3$j$. In some embodiments, the first emission start signal EFLM1, the second emission start signal EFLM2, and the third emission start signal EFLM3 may have the same width.

When the first emission start signal EFLM1 is supplied, the first emission control driver 700 sequentially supplies the first emission control signal to the first emission control lines E11 to E1$k$. In this case, the first emission control signal supplied to an i-th first emission control line E1$i$ may be supplied to overlap at least one scan signal supplied to an i-th first scan line S1$i$.

When the second emission start signal EFLM2 is provided, the second emission control driver 800 sequentially supplies the second emission control signal to the second emission control lines E21 to E2$n$. In this case, the second emission control signal supplied to an i-th second emission control line E2$i$ may be supplied to overlap at least one scan signal supplied to an i-th second scan line S2$i$.

When the third emission start signal EFLM3 is provided, the third emission control driver 900 sequentially supplies the third emission control signal to the third emission control lines E31 to E3$j$. In this case, the third emission control signal supplied to an i-th third emission control line E3$i$ may be supplied to overlap at least one scan signal supplied to an i-th third scan line S3$i$.

When the display device is driven in the first mode, the first, the second, and the third emission control drivers 700, 800, and 900 repeat the foregoing process. That is, when the display device is driven in the first mode, the first, the second, and the third emission control drivers 700, 800, and 900 sequentially drive the first, the second, and the third emission control lines E11 to E1$k$, E21 to E2$n$, and E31 to E3$j$ in the order of a first pixel area 602, a second pixel area 604, and a third pixel area 606.

Figure 18:
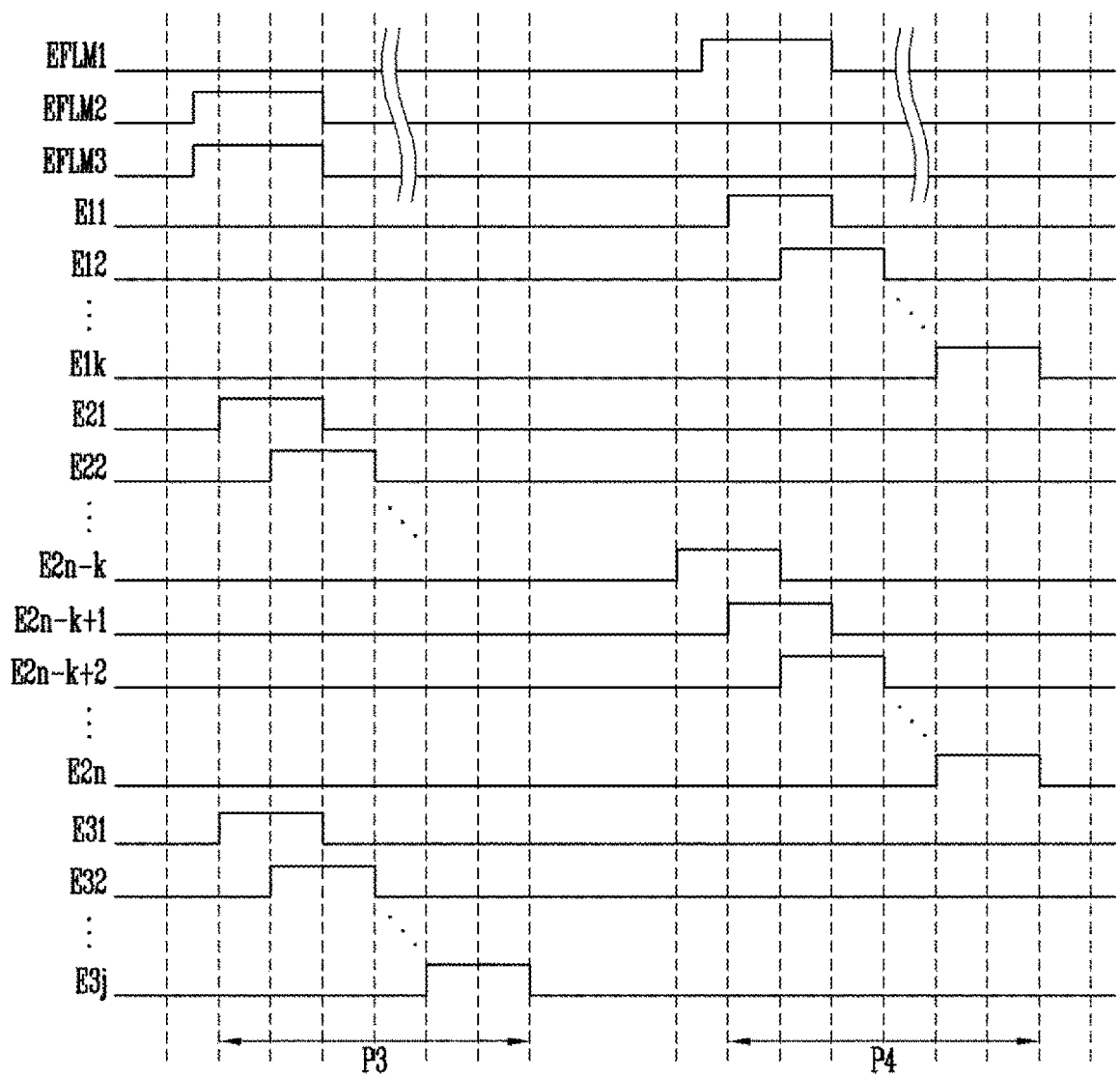
FIG. 18 shows an embodiment of driving timing of the emission control drivers when the display device shown in FIG. 13 is driven in a second mode.

FIG. 18 shows an embodiment of a driving timing of emission control drivers when the display device shown in FIG. 13 is driven in the second mode. In this case, the scan signals shown in FIG. 9 may be supplied to scan lines.

Referring to FIG. 18, when the display device is driven in the second mode, a timing controller 500 supplies (e.g., in a predetermined order) a first emission start signal EFLM1 to a first emission control driver 700, a second emission start signal EFLM2 to a second emission control driver 800, and a third emission start signal EFLM3 to a third emission control driver 900.

In this case, supply timings of the first emission start signal EFLM1, the second emission start signal EFLM2, and the third emission start signal EFLM3, are set such that first emission control lines E11 to E1$k$ and third emission control lines E31 to E3$j$ are respectively driven for some different periods during which second emission control lines E21 to E2$n$ are sequentially driven. That is, in the present embodiment, the second emission control driver 800 sequentially drives the second emission control lines E21 to E2$n$ according to the second mode, and the first and third emission control drivers 700 and 900 respectively drive the first and third emission control lines E11 to E1$k$ and E31 to E3$j$ during different periods during which the second emission control lines E21 to E2$n$ are driven.

For example, the timing controller 500 concurrently or simultaneously supplies, according to the second mode in each frame period, the second and third emission start signals EFLM2 and EFLM3 to the second and third emission control driver 800 and 900, and may provide, at a certain time after driving of the third emission control lines E31 to E3$j$ is completed, the first emission start signal EFLM1 to the first emission control driver 700. Accordingly, the third emission control driver 900 may drive, according to the second mode, the third emission control lines E31 to E3$j$ during a third period P3 (e.g., an initial period) during which the second emission control driver 800 drives the second emission control lines E21 to E2$n$ (e.g., some of the second emission control lines E21 to E2$n$). In addition, the first emission control driver 700 may drive, according to the second mode, the first emission control lines E11 to E1$k$ during a fourth period P4 (e.g., a subsequent period), which is after the third period P3, during which the second emission control driver 800 drives the second emission control lines E21 to E2$n$ (e.g., others of the second emission control lines E21 to E2$n$).

The second emission control driver 800 may drive, according to the second mode and in the third period P3, some of the second emission control lines (some of E21 to E2$n$) that are adjacent to the first pixel area 602. In addition, the second emission control driver 800 may drive, according to the second mode and in the fourth period P4, some of the second emission control lines (the others of E21 to E2$n$) that are adjacent to the third pixel area 606.

That is, when the display device is driven in the second mode, some of the second emission control signals supplied to the second emission control lines E21 to E2$n$ may overlap the third emission control signal supplied to the third emission control lines E31 to E3$j$. In addition, the second emission control signals supplied to the other second emission control lines E21 to E2$n$ may overlap the first emission control signal supplied to the first emission control lines E11 to E1$k$. In this case, the first emission control signal may be supplied after the third emission control signal is supplied.

In some embodiments, a supply timing of the first emission start signal EFLM1 may depend on the number of the first and second emission control lines E11 to E1$k$ and E21 to E2$n$. For example, when k first emission control lines E11 to E1$k$ (k is a natural number of 2 or more) are arranged in the first pixel area 602 that is positioned at an upper end of the second pixel area 604, the supply timing of the first emission start signal EFLM1 may be set such that the k first emission control lines E11 to E1$k$ are concurrently or simultaneously driven with k second emission control lines E2$n$−k+1 to E2$n$ that are positioned at a lower end area of the second pixel area 604. For example, when k first emission control lines E11 to E1$k$ and n second emission control lines E21 to E2$n$ (n is a natural number of k or more) are respectively arranged in the first pixel area 602 and the second pixel area 604, the supply timing of the first emission start signal EFLM1 may be set such that the first and second emission control drivers 700 and 800 concurrently or simultaneously provide, according to the second mode, the emission control signal to a first first emission control line E11 and an n−k+1-th second emission control line E2$n$−k+1, respectively.

After respectively concurrently or simultaneously receiving the second and third emission start signals EFLM2 and EFLM3 from the timing controller 500, the second and third emission control drivers 800 and 900 respectively output, according to the second and third emission start signals EFLM2 and EFLM3, the emission control signal to the first second emission control line E21 and the first third emission control line E31. That is, the second and third emission control drivers 800 and 900 may concurrently or simultaneously provide, according to the second mode, the emission control signal to a first second emission control line E21 and a first third emission control line E31.

After receiving the first emission start signal EFLM1 from the timing controller 500, the first emission control driver 700 may output the emission control signal to the first first emission control line E11 according to the first emission start signal EFLM1. In addition, when the second emission control driver 800 outputs the emission control signal to a last second emission control line E2n, the first emission control driver 700 may output the emission control signal to a last first emission control line E1k. That is, the first emission control driver 700 and the second emission control driver 800 may respectively concurrently or simultaneously supply the emission control signal to the last first emission control line E1k and the last second emission control line E2n.

In some embodiments, when the display device is driven in the second mode, the first and/or third pixel areas 602 and 606 may be reduced or prevented from actually emitting light by controlling the widths of the first and/or third emission start signals EFLM1 and EFLM3. For example, in some embodiments, by increasing the widths of the first and/or third emission start signals EFLM1 and EFLM3, an emission time of the first and/or third pixel areas 602 and 606 may be reduced to decrease overall luminance of the first and/or third pixel areas 602 and 606, or emission of the first and/or third pixel areas 602 and 606 may be selectively turned off. For example, the widths of the first and/or third emission start signals EFLM1 and EFLM3 may be increased such that the emission of the first and/or third pixels PXL1 and PXL3 is reduced or prevented for at least some of the periods during which the display device is driven in the second mode.

Although the technical idea of the present invention has been specifically described in accordance with the above-described embodiments, it should be noted that the above embodiments are intended to be illustrative and not restrictive. It will be apparent to those skilled in the art that various modifications may be made without departing from the scope of the present invention.

The scope of the present invention should not be limited to the details described in the detailed description of the specification, but should be defined by the claims. Also, it is intended that all changes and modifications derived from the meaning and scope of the claims and their equivalents be included within the scope of the present invention.

What is claimed is:

1. A display device comprising:
a display area configured to display an image according to a first mode and a second mode in different areas, wherein the display area comprises a first pixel area, a second pixel area, and a third pixel area that are sequentially arranged;
first pixels and first scan lines in the first pixel area;
second pixels and second scan lines in the second pixel area;
third pixels and third scan lines in the third pixel area;
a first scan driver configured to drive the first scan lines;
a second scan driver configured to drive the second scan lines; and
a third scan driver configured to drive the third scan lines,
wherein, according to the second mode, the second scan lines are sequentially driven by the second scan driver, and the third scan lines are driven by the third scan driver for a first period during which the second scan lines are driven,
wherein, according to the second mode, the first scan lines are driven by the first scan driver for a second period, which is after the first period, during which the second scan lines are driven,
wherein at least some of the second scan lines adjacent to the first pixel area are driven in the first period,
wherein at least some others of the second scan lines adjacent to the third pixel area are driven in the second period, and
wherein the first period and the second period are in one frame period.

2. The display device of claim 1, wherein the first scan lines, the second scan lines, and the third scan lines are sequentially driven by the first scan driver, the second scan driver, and the third scan driver according to the first mode.

3. The display device of claim 1, further comprising a timing controller configured to provide a first start signal, a second start signal, and a third start signal to the first scan driver, the second scan driver, and the third scan driver, respectively.

4. The display device of claim 3, wherein the timing controller is configured to sequentially supply the first start signal, the second start signal, and the third start signal according to the first mode.

5. The display device of claim 3, wherein the timing controller is configured to concurrently supply the second and third start signals according to the second mode, and to then supply the first start signal.

6. The display device of claim 1, wherein a first second scan line of the second scan lines is adjacent to a last first scan line of the first scan lines, and
wherein a last second scan line of the second scan lines is adjacent to a first third scan line of the third scan lines.

7. The display device of claim 6, wherein the second and third scan drivers are configured to concurrently supply a scan signal to the first second scan line of the second scan lines and the first third scan line of the third scan lines according to the second mode.

8. The display device of claim 6, wherein k first scan lines (k being a natural number of 2 or more) are arranged in the first pixel area, n second scan lines (n being a natural number of 2 or more) are arranged in the second pixel area, and
wherein the first and second scan drivers are configured to concurrently supply a scan signal to a first scan line of the first scan lines and an n−k+1-th second scan line of the second scan lines according to the second mode.

9. The display device of claim 1, further comprising:
data lines in the display area to cross the first scan lines, the second scan lines, and the third scan lines; and
a data driver for providing a data signal to the data lines.

10. The display device of claim 9, wherein, according to the second mode, the data driver is configured to supply, through the data lines, the same data signal to ones of the second pixels and ones of the third pixels positioned in a first horizontal line of the second pixel area and a first horizontal line of the third pixel area, respectively, and is configured to supply the same data signal to ones of the first pixels and ones of the second pixels positioned in a last horizontal line of the first pixel area and a last horizontal line of the second pixel area, respectively.

11. The display device of claim 1, further comprising:
first emission control lines connected to the first pixels;
second emission control lines connected to the second pixels;
third emission control lines connected to the third pixels;

a first emission control driver configured to provide an emission control signal to the first emission control lines;

a second emission control driver configured to provide an emission control signal to the second emission control lines; and a third emission control driver configured to provide an emission control signal to the third emission control lines.

12. The display device of claim 11, wherein the first emission control lines, the second emission control lines, and the third emission control lines are sequentially driven by the first emission control driver, the second emission control driver, and the third emission control driver according to the first mode.

13. The display device of claim 11, wherein, according to the second mode, the second emission control lines are sequentially driven by the second emission control driver, the third emission control lines are driven by the third emission control driver for a third period during which the second emission control lines are driven, and the first emission control lines are driven by the first emission control driver for a fourth period, which is after the third period, during which the second emission control lines are driven.

14. The display device of claim 1, wherein the image is displayed in the first pixel area, the second pixel area, and the third pixel area of the display area according to the first mode, and wherein the image is displayed in the second pixel area of the display area, and an image comprising a part of the image is displayed in each of the first and third pixel areas, according to the second mode.

15. The display device of claim 1, wherein the display device is configured to be driven in the second mode when mounted on a wearable device at least partially covering the first and third pixel areas, and is otherwise configured to be driven in the first mode.

16. The display device of claim 15, wherein, according to the second mode, the second pixel area is divided into a left eye area in which a left-eye image is displayed, and a right eye area in which a right-eye image is displayed, and wherein a black grayscale is displayed between the left eye area and the right eye area, in a border area between the first and second pixel areas, and in a border area between the second and third pixel areas.

17. A driving method of a display device comprising a first pixel area, a second pixel area, and a third pixel area that are sequentially arranged, the method comprising:

sequentially providing a scan signal to first scan lines in the first pixel area, second scan lines in the second pixel area, and third scan lines in the third pixel area in a first mode;

providing a scan signal to the second scan lines, and providing a scan signal to the third scan lines for a first period during which the scan signal is supplied to the second scan lines in a second mode; and providing a scan signal to the first scan lines for a second period, which is after the first period, during which a scan signal is supplied to the second scan lines, in the second mode, wherein at least some of the second scan lines adjacent to the first pixel area are driven in the first period, wherein at least some others of the second scan lines adjacent to the third pixel area are driven in the second period, and wherein the first period and the second period are in one frame period.

18. The driving method of claim 17, further comprising concurrently providing a scan signal to a first one of the second scan lines and to a first one of the third scan lines in the second mode.

19. The driving method of claim 17, further comprising concurrently providing a scan signal to a last one of the first scan lines and to a last one of the second scan lines in the second mode.

20. The driving method of claim 17, further comprising:

driving j (j is a natural number of 2 or more) third scan lines in the third pixel area along with j second scan lines adjacent to the first pixel area in the first period, and driving k (k is a natural number of 2 or more) first scan lines in the first pixel area along with k second scan lines adjacent to the third pixel area in the second period.

21. The driving method of claim 17, further comprising displaying an image in the second pixel area in the second mode.

22. The driving method of claim 21, further comprising:

displaying a portion of the image in the second pixel area that is adjacent to the third pixel area in the first pixel area in the second mode; and displaying another portion of the image in the second pixel area that is adjacent to the first pixel area in the third pixel area in the second mode.

23. The driving method of claim 17, further comprising:

providing a data signal corresponding to a left-eye image to a left eye area of the second pixel area in the second mode; and providing a data signal corresponding to a right-eye image to a right eye area of the second pixel area in the second mode.

24. The driving method of claim 23, further comprising providing a data signal corresponding to a black grayscale to an area between the left eye area and the right eye area, to a border area between the first and second pixel areas, and to a border area between the second and third pixel areas, in the second mode.

25. The driving method of claim 17, further comprising activating the second mode when the display device is mounted on a wearable device covering the first and third pixel areas.

26. The driving method of claim 17, further comprising displaying an image in the first pixel area, the second pixel area, and the third pixel area according to the first mode.

* * * * *